(12) United States Patent
Geller

(10) Patent No.: US 12,228,750 B2
(45) Date of Patent: Feb. 18, 2025

(54) VOLUMETRIC DISPLAY SYSTEMS, METHODS, AND DEVICES

(71) Applicant: Blaise Photonics LLC, Nutley, NJ (US)

(72) Inventor: Damien Blaise Geller, Los Angeles, CA (US)

(73) Assignee: BLAISE PHOTONICS LLC, Nutley, NJ (US)

( * ) Notice: Subject to any disclaimer, the term of this patent is extended or adjusted under 35 U.S.C. 154(b) by 0 days.

(21) Appl. No.: 18/769,719

(22) Filed: Jul. 11, 2024

(65) Prior Publication Data

US 2025/0020942 A1    Jan. 16, 2025

Related U.S. Application Data

(60) Provisional application No. 63/571,485, filed on Mar. 29, 2024, provisional application No. 63/526,564, filed on Jul. 13, 2023.

(51) Int. Cl.
*G03H 1/00* (2006.01)
*G02B 30/56* (2020.01)

(52) U.S. Cl.
CPC .......... *G02B 30/56* (2020.01); *G03H 1/0005* (2013.01); *G03H 2001/0088* (2013.01)

(58) Field of Classification Search
CPC ................. G02B 30/56; G03H 1/0005; G03H 2001/0088
See application file for complete search history.

(56) References Cited

U.S. PATENT DOCUMENTS

| 5,270,752 A | 12/1993 | Kataoka et al. |
| 5,854,613 A | 12/1998 | Soltan et al. |
| 5,956,172 A | 9/1999 | Downing |

(Continued)

FOREIGN PATENT DOCUMENTS

| CN | 210605345 U | 5/2020 |
| JP | 7027734 B2 | 3/2022 |

OTHER PUBLICATIONS

International Search Rreport for PCT/US2024/037540 dated Sep. 9, 2024.

*Primary Examiner* — Mohamed A. Wasel
(74) *Attorney, Agent, or Firm* — Lippes Mathias LLP

(57) ABSTRACT

Volumetric display systems, methods, and devices for generating a holographic image within an ambient atmosphere air display volume using a columnar laminar flow generation system. According to an example embodiment, a volumetric display method and system includes a columnar laminar flow generation system combining an input ambient atmosphere air flow with at least one particulate flow to generate a plurality of parallel columnar laminar atmosphere air flow streams and a plurality of parallel columnar laminar atmosphere particulate flow streams extending through an ambient atmosphere air display volume; and a laser projection system outputting a plurality of laser beams representative of the holographic image, each of the plurality of laser beams aligned to overlap a section of a single columnar laminar particulate flow within the ambient atmosphere air display volume to illuminate a target particulate flow within the respective overlapping section of the single columnar laminar particulate flow.

25 Claims, 25 Drawing Sheets

(56) References Cited

U.S. PATENT DOCUMENTS

| | | | |
|---|---|---|---|
| 6,052,100 A | 4/2000 | Soltan et al. | |
| 6,373,487 B1 | 4/2002 | Culbertson et al. | |
| 6,639,597 B1 | 10/2003 | Zwicker et al. | |
| 6,765,566 B1 | 7/2004 | Tsao | |
| 6,891,533 B1 | 5/2005 | Alcorn et al. | |
| 6,930,683 B2 | 8/2005 | Slabaugh et al. | |
| 6,940,507 B2 | 9/2005 | Repin et al. | |
| 6,990,228 B1 | 1/2006 | Wiles et al. | |
| 7,304,645 B2 | 12/2007 | Blask et al. | |
| 8,289,274 B2 | 10/2012 | Silwa et al. | |
| 8,567,954 B2 | 10/2013 | Koehler et al. | |
| 8,659,593 B2 | 2/2014 | Furukawa et al. | |
| 9,229,311 B2 | 1/2016 | Yeremian | |
| 9,958,829 B2 * | 5/2018 | Aravkin | G03H 1/2249 |
| 10,110,884 B2 | 10/2018 | Frayne et al. | |
| 10,140,759 B2 | 11/2018 | Hamada et al. | |
| 10,197,904 B2 | 2/2019 | Yliopisto | |
| 10,275,937 B2 | 4/2019 | Chien et al. | |
| 10,310,284 B1 * | 6/2019 | Waldron | H04N 13/398 |
| 10,825,367 B2 | 11/2020 | Kim et al. | |
| 10,972,680 B2 | 4/2021 | Wigdor et al. | |
| 11,092,724 B1 * | 8/2021 | Waldron | G02B 30/35 |
| 2002/0027678 A1 * | 3/2002 | Halldorsson | G02B 27/0103 |
| | | | 359/15 |
| 2002/0190984 A1 | 12/2002 | Seiler et al. | |
| 2003/0223043 A1 | 12/2003 | Yoshimo | |
| 2004/0027450 A1 | 2/2004 | Yoshimo | |
| 2004/0207652 A1 | 10/2004 | Ratti et al. | |
| 2006/0103661 A1 | 5/2006 | Mech | |
| 2010/0149182 A1 | 6/2010 | Butler | |
| 2010/0321478 A1 | 12/2010 | Silwa et al. | |
| 2011/0001804 A1 | 1/2011 | Urey et al. | |
| 2012/0274907 A1 | 11/2012 | Refai et al. | |
| 2013/0271800 A1 | 10/2013 | Kanugo | |
| 2014/0333615 A1 | 11/2014 | Ramalingam et al. | |
| 2016/0091979 A1 * | 3/2016 | Liu | G06F 3/017 |
| | | | 345/156 |
| 2017/0013251 A1 | 1/2017 | Thigpen | |
| 2017/0269372 A1 | 9/2017 | Moisant-Thompson | |
| 2017/0293259 A1 | 10/2017 | Ochiai et al. | |
| 2018/0267326 A1 | 9/2018 | Broadbent et al. | |
| 2018/0329127 A1 * | 11/2018 | Fäcke | G02B 5/32 |
| 2019/0243149 A1 * | 8/2019 | Iguchi | H01L 25/0753 |
| 2022/0196892 A1 | 6/2022 | Moriyama et al. | |

\* cited by examiner

VOLUMETRIC DISPLAY SYSTEMS, METHODS, AND DEVICES

CROSS REFERENCE TO RELATED PATENT(S) AND APPLICATION(S)

This application claims the benefit of U.S. provisional application No. 63/571,485 filed Mar. 29, 2024, and entitled Volumetric Display Systems, Methods, And Devices, and U.S. provisional application No. 63/526,564, filed Jul. 13, 2023, and entitled System And Devices That Create And Control Voxels Of Light Manipulating Them Into Mid-Air Volumetric Content With Controlled Atmosphere Array Interaction, which are hereby incorporated in their entirety by reference.

BACKGROUND

The following relates to holographic display systems, methods and devices, and the like. Specifically, this disclosure relates to hologram, holographic, and/or volumetric systems for entertainment, training, signage, interactivity, and any other desired applications. The holographic methods and systems disclosed do not require the use of a screen, containment, wearables, and/or other devices to activate or display the content. The disclosed holographic display methods and systems provide a true real-time, mid-air, volumetric display system with the ability to display 2D and 3D and volumetric and spatial content in a real 3D air space.

Conventional holographic displays are mostly illusions, reflections, transparent solid screens, or moving physical light arrays that require exploitation of the persistence of vision for hardware functioning. Most conventional volumetric displays are either contained in a box-like structure with limited viewing angles, use an extrapolation of lenticular or stereo concepts, and/or use transparent or semi-transparent displays.

There is a need for an interactive display, system, and device to display volumetric digital visual information without a screen or container.

There is a need for interacting with digital data and content seamlessly in a real world space.

There is a need for the scaling of display systems which do have limited viewing angles and provide interactivity.

Advantages and benefits provided by the disclosed holographic methods and systems include, but are not limited to, physically scalable and capable of producing volumetric objects mid-air as opposed to screen projections or contained media safer than some conventional holographic technology platforms because plasma explosions are not created in the air to achieve voxel visibility. The disclosed technology is not contained in a closed box or screen, does not have a limited view angle, and the disclosed technology is considerably more economical to fabricate than some other comparable systems. Furthermore, the disclosed technology has a large-scale range, can be used in daylight or lowlight, outdoors or indoors, and, according to some embodiments, objects of light can be interacted with via touch.

BRIEF DESCRIPTION OF THE DRAWINGS

Aspects of the present disclosure are best understood from the following detailed description when read with the accompanying FIGURES. It is noted that, in accordance with the standard practice in the industry, various features are not drawn to scale. In fact, the dimensions of the various features may be arbitrarily increased or reduced for clarity of discussion.

FIG. 1A shows a functional block diagram of a VAST system, FIG. 1B shows details of the generation of a voxel according to this disclosure, FIG. 1C shows further operation details of the generation of a laminar flow using a bottom halo and a top halo, FIG. 1D shows an example embodiment of a columnar laminar flow arrangement where sets of laminar flows are orientated or align at angles less than 90 degrees to provide an alternative arrangement for generating visible voxels from a fixed laser aperture emission point (top down XZ plane view), and FIG. 1E shows an example embodiment of a columnar laminar flow arrangement where sets of laminar flows are orientated or align at angles less than 90 degrees to provide an alternative arrangement for generating visible voxels from a fixed laser aperture emission point (top down XZ plane view), and further includes the addition of mirrors to allow more access to the laser beams to stream points.

FIG. 3A shows a layout of a simple VAST system, FIG. 3B shows further details of a laminar flow grid, and FIG. 3C is a detail drawing of a portion of laminar flow within a volumetric display.

FIG. 5A shows a bottom left perspective view; FIG. 5B shows another bottom left perspective view including the particulate piping; FIG. 5C shows another perspective view showing the combo reservoir and phase change devices; FIG. 5D shows a bottom up perspective view of the combo reservoir and phase change devices, including a main thrust section, particulate piping and a laminar grid; FIG. 5E shows a top down perspective view of the combo reservoir and phase change devices, including a main thrust section, particulate piping and a laminar grid; FIG. 5F shows a detailed example portion/cross sectional view of a portion of the laminar flow grid array, and FIG. 5G is a perspective view of an ionic wind generator.

FIG. 6A is a top angled view showing the suction fans, the laminar grid, an IR distance measuring subsystem, a laser termination component, and a computer; and FIG. 6B is a top down view showing the suction fans, IR distance measuring subsystem, a laser termination component, and a computer.

DETAILED DESCRIPTION

Figure 1A:
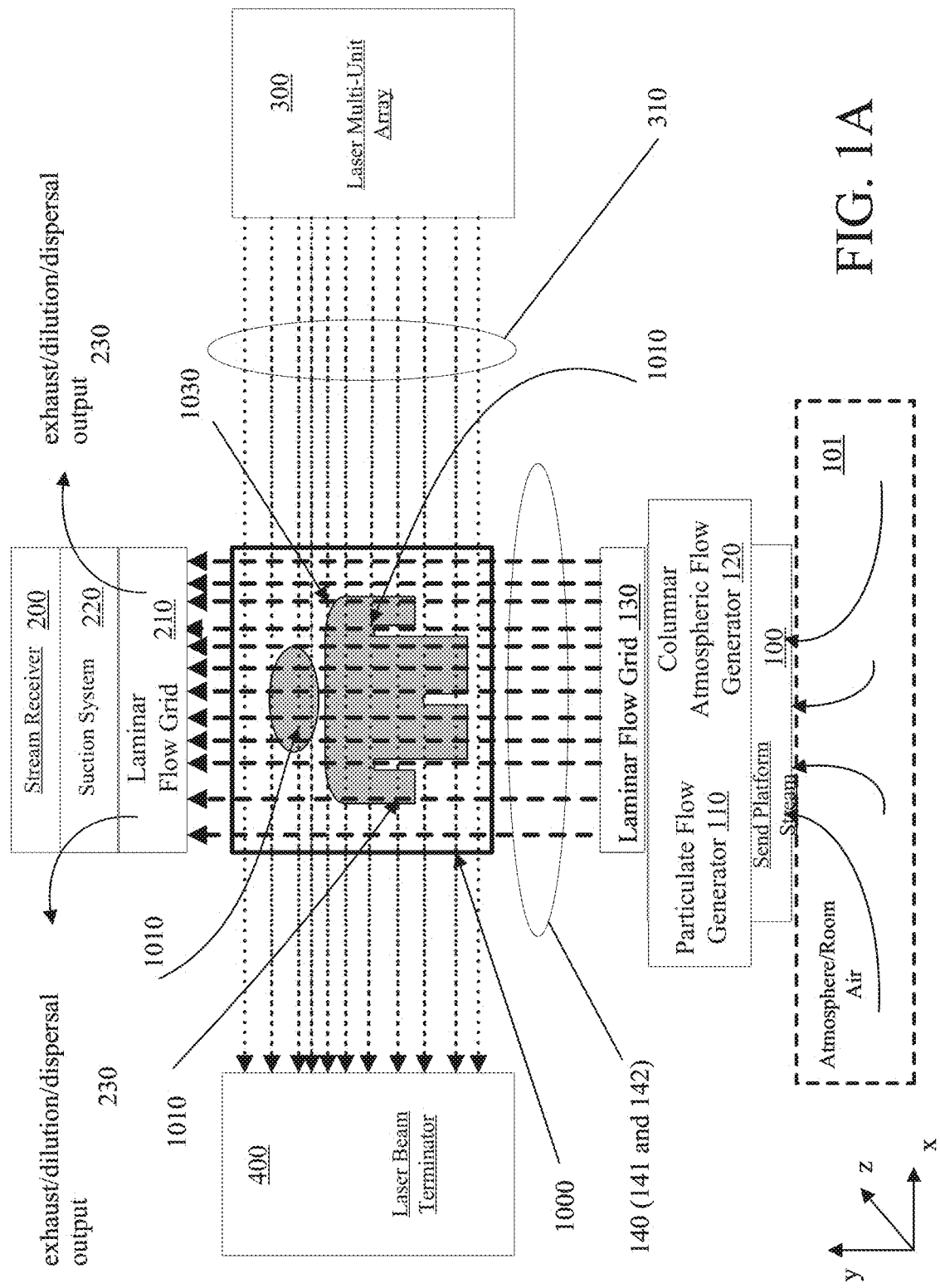
FIGS. 1A-1E illustrate various operation details of a Voxel-Atmosphere Stabilization Terminal (VAST) system according to an example embodiment of the present disclosure, where

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper", "top, "bottom", "side", "right", "left", "base" and the like, may be used herein for ease of description to describe one element or feature's relationship to another element(s) or feature(s) as illustrated in the FIGURES. The spatially relative terms are intended to encompass different orientations of the device in use or operation in addition to the orientation depicted in the FIGURES. The apparatus may be otherwise oriented (rotated 90 degrees or at other orientations) and the spatially relative descriptors used herein may likewise be interpreted accordingly.

This disclosure, and the example embodiments described herein, provide a holographic display system that presents, i.e., displays, mid-air, volumetric, interactive, multisensory, and spatial content. According to an example embodiment of this disclosure, the holographic display system includes a) a base unit to receive and combine a particulate and conditioned atmosphere air, and generate and direct/guide a plurality of parallel volumetric columnar laminar flows including the combined particulate and atmosphere air, b) an atmosphere receive unit that receives the base unit generated volumetric columnar laminar flow, c) a laser beam array projection system that transmits an array of laser beams which are controlled to intersect/overlap one or more of the base unit generated parallel volumetric columnar laminar flows to illuminate particulate contained within a desired volumetric columnar laminar flow which is associated with an image rendering of an object projected by the laser beam array projection system.

According to an example embodiment, a content control module is operatively connected to the laser projection system, either via a wired or wireless communication channel, and provides the image content to the laser projection system for projection on the volumetric columnar laminar flow.

Additional features, which may or not be integrated with the disclosed holographic display, will be further described herein and include, but are not limited to, an interactive spatial sensor module and system that provide a user to interact with the displayed hologram, and an audio system integrated with the disclosed holographic display system.

As previously described, the disclosed holographic methods and systems provide a physically scalable holographic display with volumetric objects mid-air as opposed to screens, meshes, films, or contained solid media in LED's or otherwise. Currently available holograms and holographic systems' approaches, with the exception of some contained hardware volumetric systems, have very limited angles at which you can view content preventing you from seeing content all the way around by walking or moving around it, notably limited interactivity with content in real world space breaking their intended illusions, limited lighting conditions which cause imperceptibility or break their intended illusions, using purposefully misleading illusions to attempt to communicate the idea or aspects of the idea of floating volumetric content or objects. The disclosed holographic meths and systems provide an improvement on what is currently available and differs greatly, and it is safer than plasma pulse laser hologram content. No other available hologram display or holographic system currently provides the following: 1) can be seen from essentially any angle in the X, Y and Z, axes by multiple people around the display simultaneously with the exception of intentionally standing behind hardware parts, 2) can be updated in real time or with premade content, can be temporarily or permanently installed, 3) can have a scale as big as a shipping container or as small as a match box, 4) has strong visibility even with competing light such as in well-lit rooms or with full sunlight coming in unobstructed windows, 5) uses no screen or mesh to reflect content and is actually volumetric, 6) no need for LED's in any part for the visible light content, light voxel content actually floats and changes mid-air in front of viewer, actual full 3-dimensional touchable light objects suspended in the middle of the air, interactable from multiple directions including behind, in front, above and beneath, 7) the ability to range in scale and resolution via modular components and custom builds, and 8) there is no stereoscopy or lenticular or "3d effect"—this is not illusion.

For purposes of this disclosure, the disclosed holographic system may be referred to as a Voxel-Atmosphere Stabilization Terminal (VAST) System which provides a complete mid-air volumetric display system which may also be configured as an interactive mid-air volumetric display system of its kind. The disclosed VAST system provides mid-air, visible, volumetric 3D voxels of RGB+ light suspended visibly and stable, controllable, optionally dimmable with coordinated spatial audio, and midair touch reactivity, to be used for entertainment, training, signage, interactivity, and any other desired applications.

According to one example embodiment which will be further described herein, the VAST system includes the following: 1) a top unit which is a laminar atmosphere receive unit and control with 4 mini audio speakers facing outward to minimally interfere with flow inside the system. 2) a base unit is the laminar atmosphere send unit and control with lesser power than the receive. The base unit conveniently contains the content control compute module with operator secondary monitor screen and peripherals, custom software, audio splitter, spatially placed audio mini 4 speaker array, infrared input circuit board for touch spatial information for real-time interaction via infrared sensor modules to the compute module. 3) a right unit is the laser beam projector which receives content display instructions from the built-in compute module or other input method, wired or wirelessly. 4) a left unit is the laser beam termination container. The four main units mentioned (top, base, right and left) may be configured to be directly connected via structural or wiring elements, or they may exist wirelessly interacting based on installation parameters.

According to another example embodiment of this disclosure, provided is a VAST system that relates to volumetric display technology. The VAST system is a display system that presents mid-air, volumetric, interactive, multisensory, spatial content. According to this example embodiment, the system includes a custom-liquid reservoir, a fluid phase change device with control circuitry, ducting for particulate, a laminar ducting grid array, ionic wind generators, controlled atmosphere volume, atmosphere receive mechanism, content control compute module, custom software, spatial audio splitter module, spatial audio speaker array, distance sensor modules, distance input circuitry, laser output projector, and laser termination unit. temperature management, signage display and control, with infrared or laser beam alignment sensor function. The base unit is the atmosphere send base and control with lesser atmosphere output power than the receive. It has atmosphere conditioning layers, content compute module and firmware, compute interface and software, ambient temperature pressure adjust, and hydrophobic stream piping, condensation catch, particulate ducting system, temperature management, laser beam alignment. The right unit is a laser beam send unit with a laser projector and beam alignment. The left unit is the laser beam receive unit and signage with infrared beam alignment and structural wire connects. The laser beam send projector with the invisible particulate stream being sent from base unit creates mid-air, visible, volumetric 3d voxels of light suspended visibly and practically stable. The atmosphere receive unit above provides control of ambient air via strong suction array, structural support, viscous shearing, inducement, and the Coanda effect. With the volume in constant flow, the ambient viscous shearing pulls the particulate flows contained inside along with it creating the first ever mid-air volumetric interactive display system.

Provided now is a description of the operation principles of the disclosed VAST method and systems. While the description that follows describes the use of vertical laminar flow streams, it is to be understood that that the orientation of the vertical laminar flow is not limited to a vertical orientation in other embodiments.

The disclosed VAST system create vertical streams of invisible particulate-air that serve to overlap with crossing light beams, i.e. laser beams, thereby creating illuminated voxels. To accomplish this, the system maintains the integrity of the uniform smoothness of the stream as much as possible as it passes from through the air around it. In fluid dynamics, aerodynamics determines the performance of air when flowing through or around a body.

The disclosed VAST system introduces invisible or near-invisible particulate streams into invisible air, but to precisely send laser beams to specific 3D coordinates within the particulate streams, the system maintains the integrity of the streams via viscous shearing, ion wind, and inducement controlling ambient air.

A relatively large atmosphere volume of ambient air is created via an atmosphere send unit. The atmosphere send unit pushes with a certain speed ambient air upwards, i.e., vertically, to an atmosphere receive unit which strongly pulls air upwards as well, completing a smooth invisible volume of continuous flow. The disclosed VAST system introduces invisible particulate streams in a strategic orientation in and up from the bottom base atmosphere send unit. With the volume in constant flow, the viscous shearing, propulsion, and inducement of air pull the particulate flows contained inside along with it, functionally maintaining coherent integrity and stability of streams. The whole atmosphere volume is in a laminar or near-laminar flow state, using pressure-reactive directed ambient air to maintain the integrity of the streams like an enveloping barrier. According to an example embodiment, the rate of flow of the top receive unit exceeds the rate of flow of the bottom unit, as pulling the air introduces less turbulence than the propulsion from the base.

The generated atmosphere volume now includes an array of X and Z plane particulate stream points extruded vertically in the Y axis direction in real space with a near-infinite analog Y resolution. This quantifiable XYZ array is the first physical aspect that determines the volumetric light content resolution of the VAST system.

A VAST laser output projector includes custom-made and calibrated content. This content is playable via an interactive or other playback software that correlates to the light beams to overlap desired particulate stream points in real space which correlate to the creation of coherently recognizable volumetric light objects. In other words, the light content overlap points of particulate streams and light beams create visible voxels that make a coherently recognizable light object in the air. To create or display visual content, the light object may hit the columns of streams, either simultaneously or temporally, to present a volumetric staggered perceptible-planar content concept made of individual streamed columns, or a more richly coherent volumetric object or objects throughout available stream column resolution(s).

According to another aspect of the disclosed VAST system, the displayed visual and audio content may include post-modified or real-time content 2D video and mono or stereo audio conversion to an extrapolated 3D volumetric and spatial representation via our hardware and custom software solutions. One example includes the use of the VAST system for a video call that is custom processed to mid-air volumetric interactivity and the like. The light content is coordinated with a spatialized audio speaker array and audio content to correlate or compliment the real time or pre-rendered light content. Intended to simulate spatial sound emitting from the voxels or light objects, as well as provide ambient or transitional or functional sounds.

The volumetric light content and spatial audio content may also perceptibly correlate to mid-air points in real 3D space that serve as mid-air distance sense input points. This allows the content to be responsive to touch without peripherals. This creates a floating visible and audible touch-reactive button or slider or other interactive component or character dependent on desired creative content and experience. According to one aspect of the disclosed VAST system, a floating light object is generated with an ambient hum that may serve as a button or other control or touch-reactive character to advance content or state of the system software.

Together with all the functional elements described, the disclosed VAST system creates mid-air, visible, dimmable, updating, 3D voxels of RGB+ light suspended reasonably stable, with spatial audio features, and mid-air touch interaction. Other variations can include ultrasonic, electromyographic, haptic, voice, chemical, chain reaction, or other interactivity or input.

With reference to FIG. 1A, illustrated is a volumetric columnar display system according to an example embodiment which provides a basis for a fundamental understanding the operation of the disclosed volumetric columnar display system.

As shown in FIG. 1A, the disclosed holographic display system includes a base unit 100 for generating and sending particulate streams to a top stream receiver unit 200, thereby creating a plurality of columnar laminar flow streams vertically oriented on an XYZ grid.

The base unit 100 includes an invisible-particulate-air-media creator 110 which uses a base compound or fluid, and a phase change mechanism and propulsion system, e.g., haze production machine with components including fluid reservoir, phase change heating element, piping/ducting, propulsion elements like fans and peristaltic pumps, or similar and atmosphere/room air inlets 101. Strategic ducting and/or piping move particulates and air media into an array 130 for the forming of an invisible display volume 1000, i.e., a mid-air real-world space for invisible mid-air volume.

An inlet array 210 included in a stream receiving unit 200 receives the particulate media and provides additional air control via a suction or vacuum system 220 and ducting to a particulate dilution system and/or recycling/redistribution/dispersement 220 of the particulate media.

A graphics capable laser and/or light source 300 controls the light content 310 to generate an image 1030 in mid-air by overlapping 1010 with the streams of invisible particulate media 140. A control computer (not shown) and/or circuitry processes content for display and provides additional data processing.

A laser beam terminator system 400 provides blockage of light outside of the invisible display volume 1000 for safety and/or control of light.

All the above work together as one system to create the mid-air volumetric light content within the invisible bounds of the mid-air volume 1000.

Optional additional interaction, input, output, and playback devices to enhance experience or functionality (i.e.—touch screens, depth sensors, speakers, microphones, etc.) Interactive control and any/all components can operate any whole or part of the system. Components may be but are not limited to keyboards, mice, touchscreens, sensors, buttons, or any other method of interaction and/or display.

As described above, the disclosed VAST system includes hardware and software systems including multiple components to create and control from physical-to-digital input, volumetric light content visible in an open-air convergence volume of overlapping arrays. The base media is the particulate-air array(s) 140 combined with the overlap of light 310 to create perceptible volumetric content in what is effectively empty space with no containment. According to one aspect, a user may manipulate 3D computer graphics (CG) objects on a computer which converts a desired display content to signals to send laser beams 310 to precise points in real space to overlap with particulate stream arrays 140 to together create voxels of light at their intersection points. These created voxels are the building blocks of the mid-air volumetric content described herein.

Other software aspects of control functions are provided by one or more computers or modules integrated in one or more of the base unit 100, stream receiver 200, laser unit 300 and/or other content/function control unit for basic interactivity, design, and control of content displayed by system, as well as hardware and circuitry for sensing input, interactivity, output, and playback including control/design/manipulation aspects (i.e.—gesture inputs, depth/motion capture, on/off or mode buttons, cueing motorized motions, etc.)

In operation, the example VAST shown in FIG. 1A operates as follows:

a) a haze/particulate creation and distribution system including a liquid/media is heated into a gaseous state of particulate-air media.

b) a particulate-air media is propelled into ducting that leads to desired outlet array into a desired invisible volume space.

c) a receiving particulate-air inlet array with ducting redistributes and/or dilutes the particulate media.

d) light sources, like a controllable graphics capable laser with an aperture/output, are aimed at the invisible display volume (the output particulate-air streams) with computer control to create a desired light output. Mid-air overlap points of normally invisible light beams and normally invisible particulate-air streams create visible mid-air voxels with no generally perceptible containment. Streams are controlled for maximum laminar-flow-based stability through invisible volume and beams are shot to precise intersection points of those streams to create desired content. 3D interpolation of content image files, e.g., 2D image files, is performed in the control software.

Additional performance elements may include interference mitigating components and/or layering of all types; installation mounting and/or travel/storage/carrying casing and/or protection/safety components; and attached and/or free-standing interference mitigation components.

In general, the device is a display technology, with, optionally interactive visual and audio capability. It is primarily for displaying volumetric content made of light in real 3D space mid-air. Like standard display devices, it may be passive or interactive, may include sound or other sense-specific media, may have different scales and/or resolutions, and may have specific limitations based on those builds' properties. Main uses are for, but not limited to, advertising or entertainment or data/training or telepresence or interactivity or artwork; generally falling under various types of communication and display of media and information as a bridge for the digital to enter our 3D world space without illusion or the limits of other display and interaction technologies. Furthermore, this technology may be used for perceptibility or communications interim/connecting or starting points for various types of display or data storage or coded communication or simulation or rehabilitation or others.

Figure 1B:
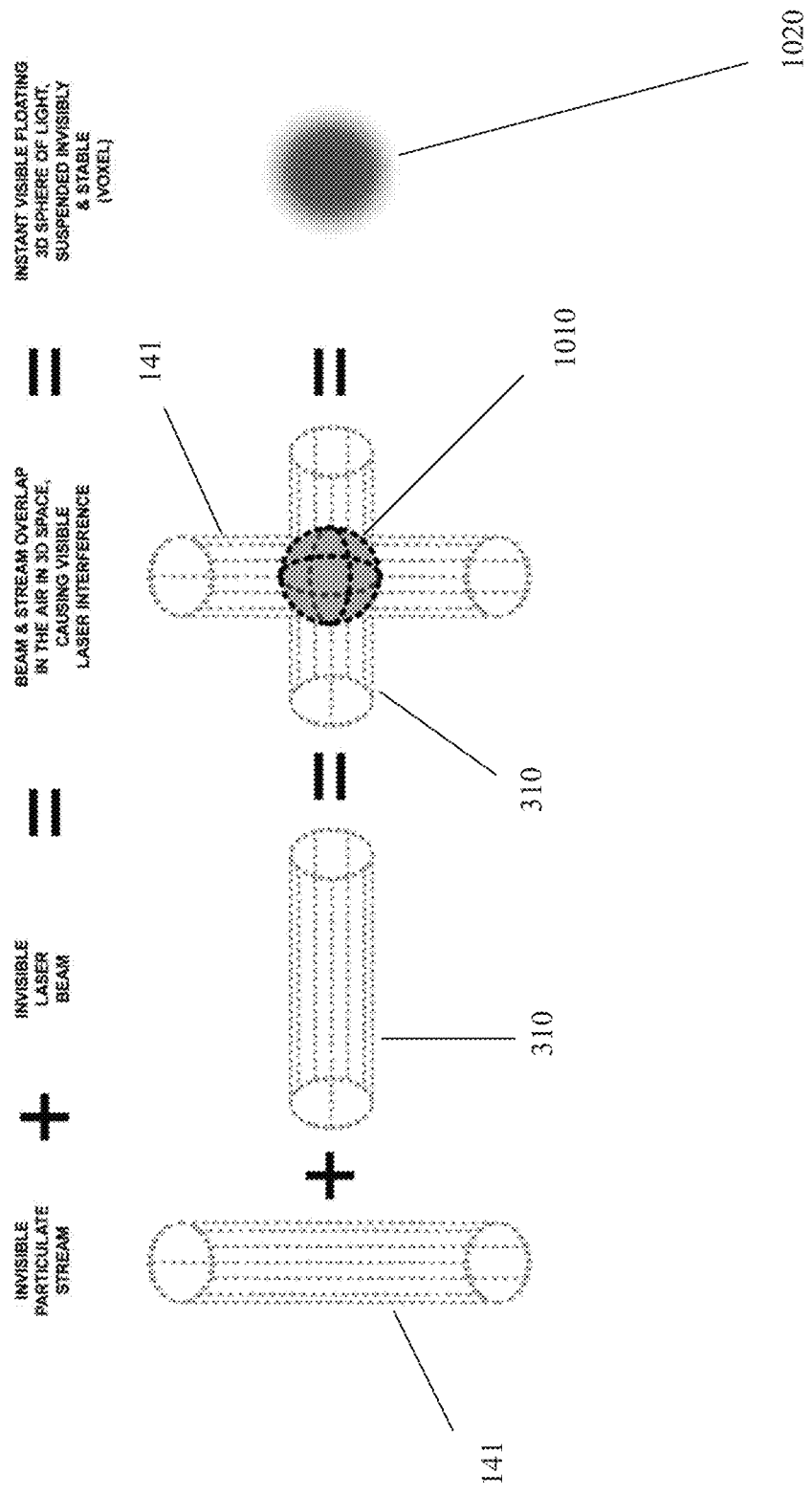

With reference to FIG. 1B, shown are some further fundamental details of how the disclosed VOXEL system operates to create a voxel 1020 using an invisible particulate stream 141, invisible laser 310, and beam & stream overlap 1010 in the air in 3D space, causing visible laser interference, thereby providing an instant visible floating 3D sphere of light 1020 using a suspended invisible & stable voxel.

Figure 1C:
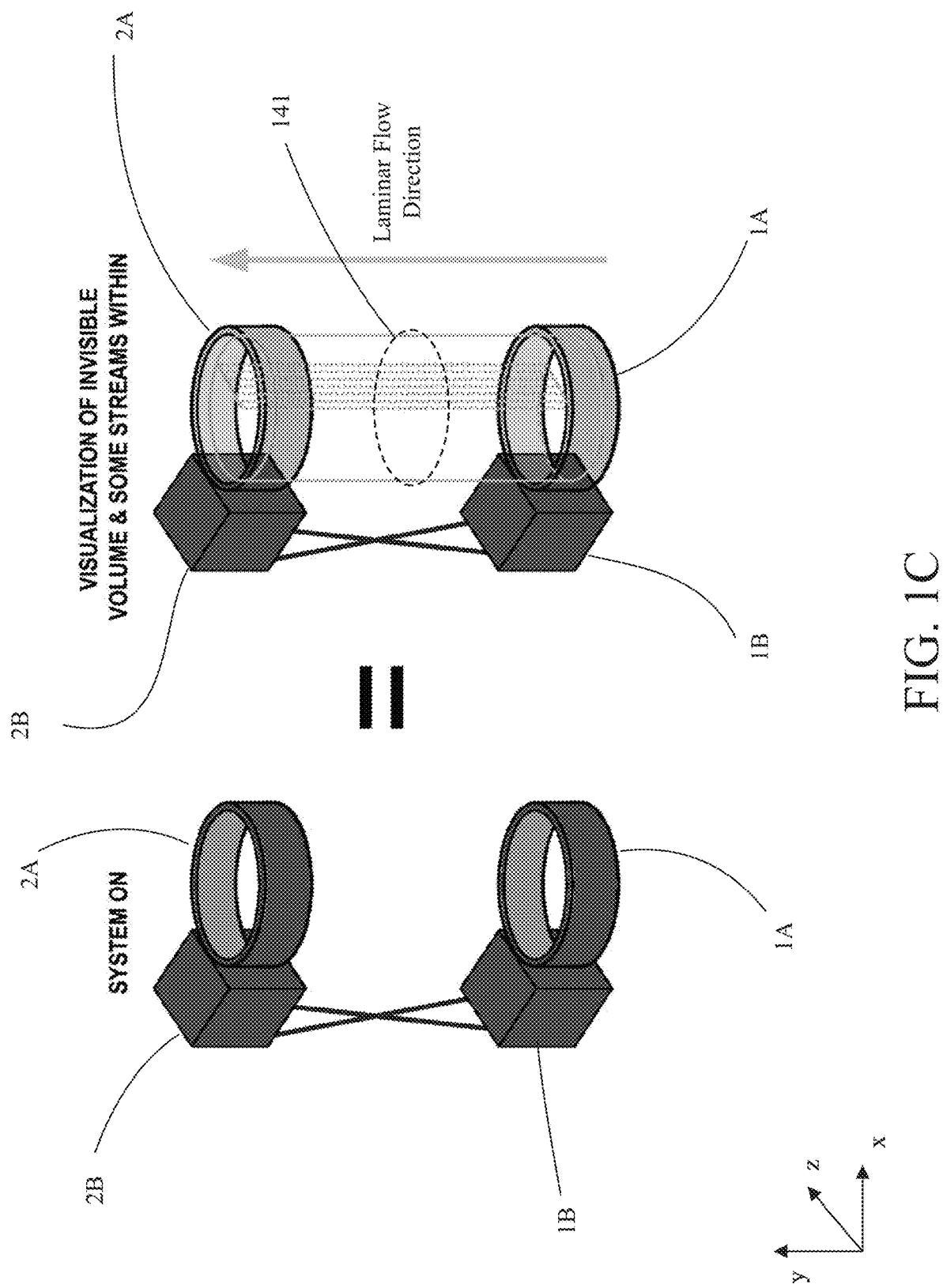

With reference to FIG. 1C, described now are further details associated with controlling an invisible stream in an invisible volume according to an example embodiment of this disclosure.

As previously described, initially, laminar flow vertical streams 141 are created of invisible particulate-air that serve to overlap with light beams. The system must maintain the integrity of the uniform smoothness of the stream as it passes up and through the air around it. In fluid dynamics, aerodynamics determines the performance of air when flowing through or around a body. To introduce invisible particulate streams into invisible air, and precisely send laser beams to them, the integrity of the streams is maintained via viscous shearing and inducement to control the ambient air.

A larger volume cylinder made of ambient air is created via a laminar "send" halo 1A. The same principle for this aspect is used in bladeless fans. As shown in FIG. 1C, this halo 1A with a certain speed pushes ambient air upwards to a "receive" halo 2A pulling air upwards as well, completing a smooth invisible cylinder of ambient flow, where surrounding air is drawn into an airflow, an airfoil section (1A/2A) creates negative pressure, viscous shearing draws air in, and the result is a high speed jet of air flowing from the bottom halo 1A towards the top halo 2A.

With further reference to FIG. 1C, introduced are invisible particulate streams 141 in a strategic orientation from the bottom send halo 1A/1B. With the volume in constant flow between the halos 1A and 2A, ambient viscous shearing pulls the particulate flows contained inside along with it. The whole volume is in a laminar flow state, using pressurized and directed ambient air to maintain the integrity of the streams like an enveloping barrier. According to an example embodiment, the rate of flow of the top halo unit 2A/2B exceeds the rate of flow of the bottom halo, as the act of pulling the air introduces less turbulence. The result is a strategic array of X and Z plane stream points (defined limit) extruded in the vertical Y direction (near infinite Y resolution). This quantifiable XYZ array determines the volumetric resolution of the system.

Figure 1D:
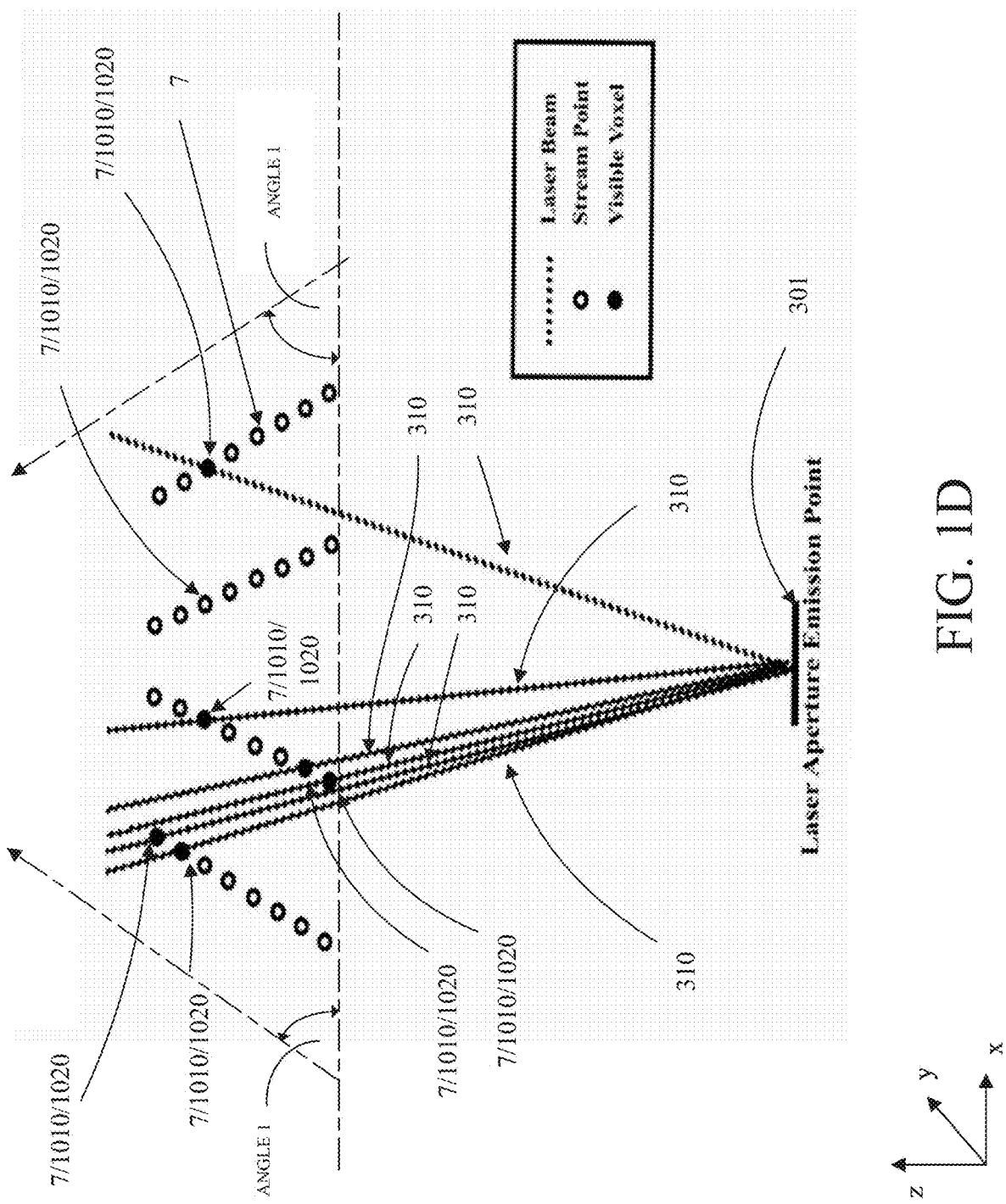

FIG. 1D shows an example embodiment of a columnar laminar flow arrangement where sets of laminar flows 310 are orientated or aligned at angles less than 90 degrees (ANGLE 1) to provide an alternative arrangement for generating visible voxels 7;1010;1020 from a fixed laser aperture emission point 301 (top down XZ plane view).

Figure 1E:
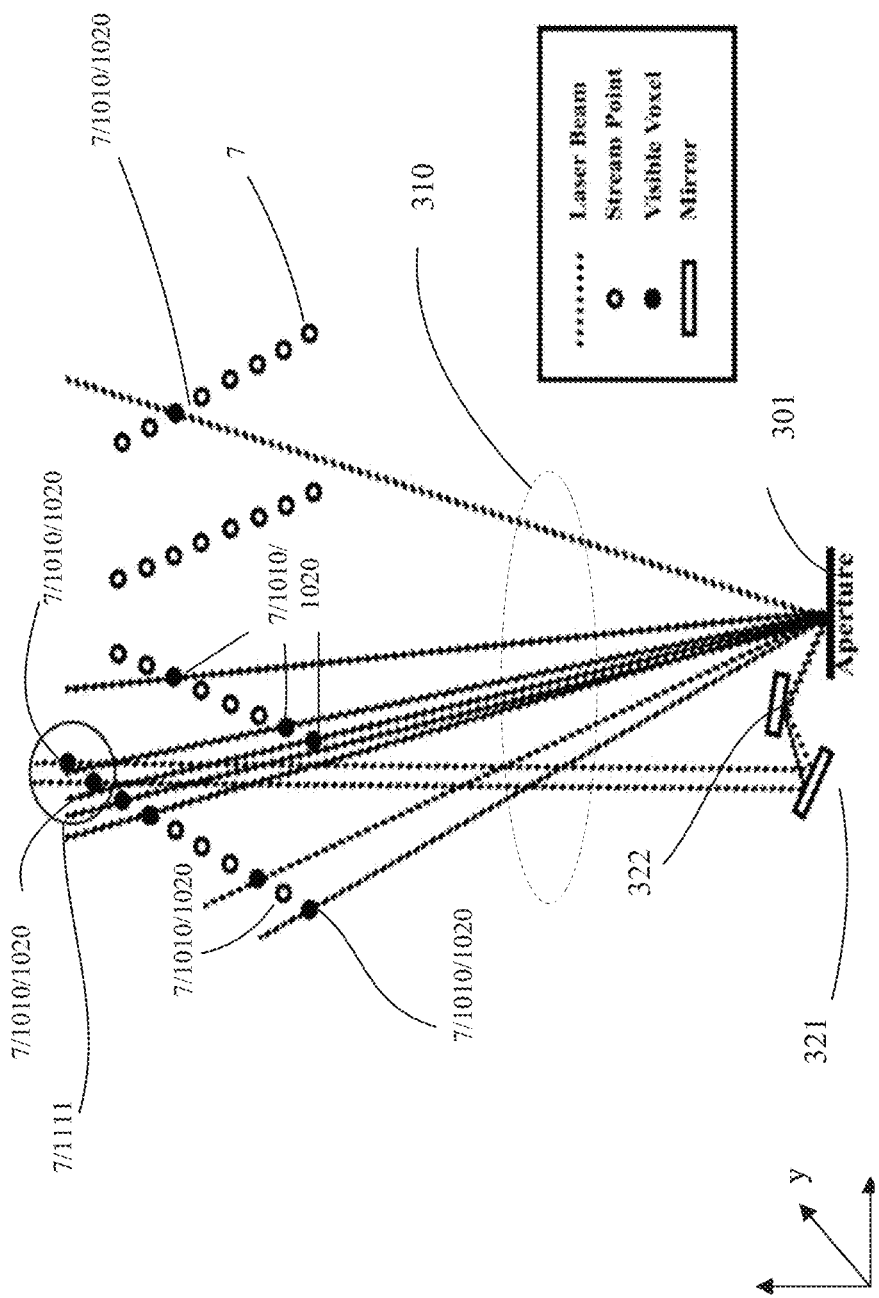

FIG. 1E shows an example embodiment of a columnar laminar flow arrangement where sets of laminar flows 310 are orientated or align at angles less than 90 degrees (ANGLE 1) to provide an alternative arrangement for generating visible voxels 301 from a fixed laser aperture emission point 301 (top down XZ plane view), and further includes the addition of mirrors 321 and 322 to allow more access for the laser beams 310 to overlap stream points 7/1111 without comprising other streams which increases display resolution.

According to an example embodiment of the disclosed VAST system, the VAST system includes the following:

A ground unit (e.g., 100 as shown in FIG. 1A) including: a laminar send halo 1A & control 1B (less power of receive) including atmosphere conditioning layers; hydrophobic stream column piping; condensation catch; dream fluid phase change system; particulate fluid reservoir; clean reservoir (auto-cleaning cycle); temperature management; and infrared beam alignment.

The invisible volume created is characterized as a dominant atmosphere laminar volume and particulate stream column array 141.

A top unit (e.g. 200 as shown in FIG. 1A) includes a laminar receive halo 2A & control 2B including temperature management, signage display & control and infrared beam alignment.

A right unit (e.g. 300 as shown in FIG. 1A) includes a laser beams send, content compute module & firmware, computer interface & software, ambient temperature pressure adjust and infrared beam alignment.

A left unit (e.g., 400 as shown in FIG. 1A) includes a laser beam receive & signage, infrared beam alignment and structural wire connects.

Figure 2:
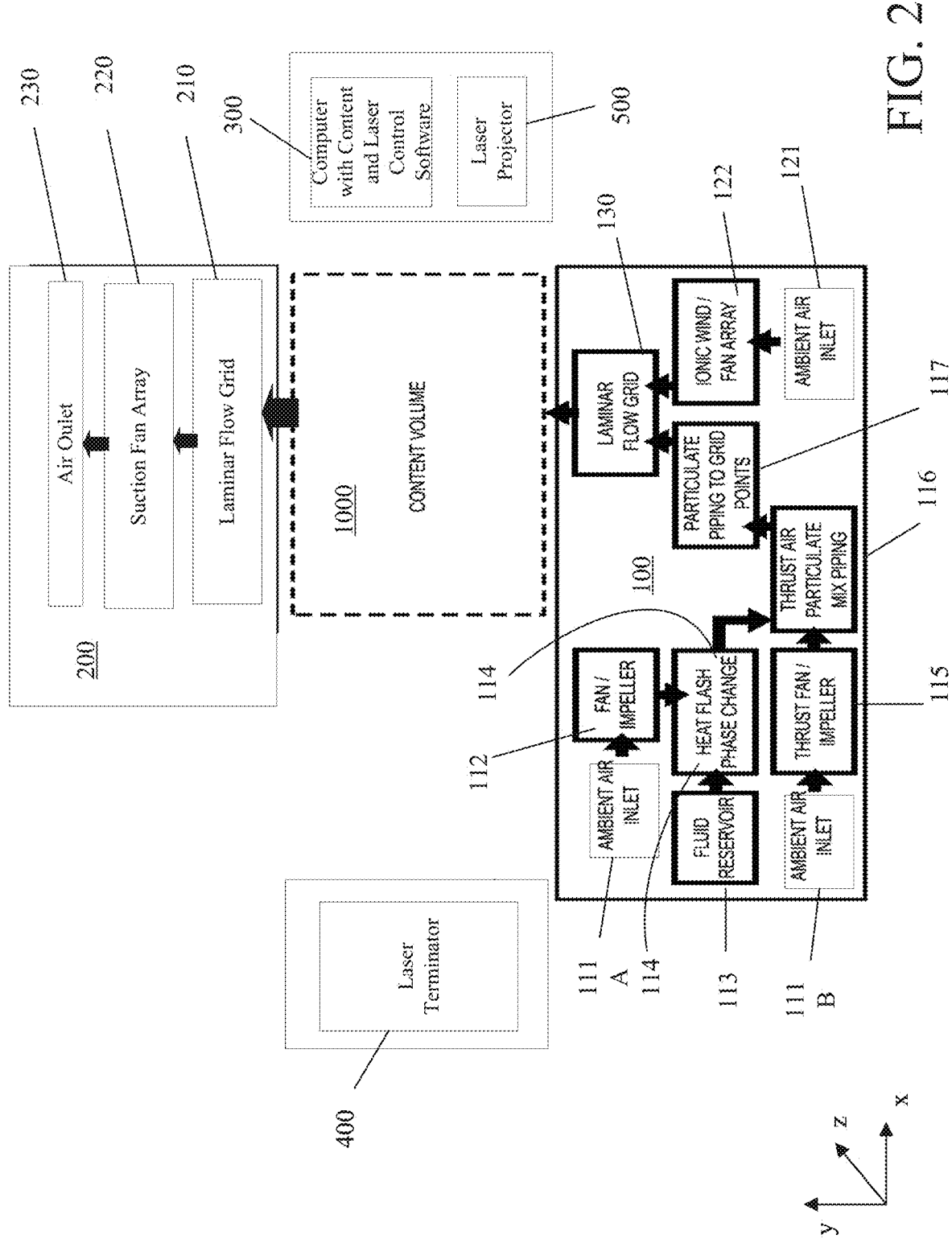
FIG. 2 is a functional diagram of a VAST system according to example embodiments of the present disclosure, the VAST system including a base unit, a top unit, a laser unit, and a laser termination unit.

With reference to FIG. 2, illustrated is a functional diagram of another example VAST system according to the present disclosure, the VAST system including a base unit 100, a vertically displace top unit 200, a laser unit 400 and a laser termination unit 400.

In operation, the base unit 100 operates as follows:

A particulate flow generation system (111A, 112, 113, 114, 111B, 115, 116, 117) injects a plurality of particulate streams (e.g., 141 as shown in FIG. 1A) into a plurality of discrete flow guides included in the laminar flow grid 130. The discrete particulate flow guides are arranged and separated by a plurality of other atmosphere flow guides included in the laminar flow grid 130 which receive a plurality of ambient atmospheric air flows 142 generated from an ambient air flow generation system including ambient air inlet 121 and an ionic wind/fan array 122. Both the particulate flow guides and the atmosphere flow guides include an inlet end receiving at least a portion of an ambient atmosphere air flow generated by ionic wind generator array 122 or at least a portion of one or more particulate flows, an outlet end, and a hollow center volume extending from the inlet end to the outlet end, where the flow from the outlet ends are laminar flows of the respective injected particulate flows or atmosphere air flows provided by an ionic wind/fan array 121 to produce the ambient atmosphere air display volume 1000.

More specifically, the particulate flow generation system intakes, via a first ambient air inlet 111A ambient air which is propelled using a fan/impeller 112 to a heat flash phase change device 114, and intakes a particulate material which is phase changed from a liquid form which is provided by a particulate fluid reservoir 113 using the heat flash phase change device 114. A second ambient air inlet 111B, thrust fan/impeller 115, thrust air particulate mix piping 116, and particulate piping to the grid points 117 provide the particulate flow that is injected into the laminar flow grid 130. In other words, the phase change device 114 operates by vaporizing a water and glycol-based or glycerin-based particulate fluid. This fluid vaporizes or atomizes by flash evaporation at a temperature of ~440 degrees fahrenheit which creates a semi-dense particulate cloud which is ejected into and diluted via mixture with air by the main thrust impeller 115.

In operation, the top unit 200 operates by intaking or receiving the base unit generated columnar laminar particulate flows and ambient air flows through a laminar flow grid 210 which also may include plurality of flow guides similar to the particulate and ambient air flow guides previously described with reference to laminar flow grid 130. A suction fan array 220 and air outlet 230, as well as laminar flow grid 210, operate to supplement the laminar control of the initial particulate and ambient air flows and trajectories generated by the base unit 100. In addition, air outlet 230 is operatively associated with an exhaust/particulate dilution/particulate dispersal system. According to one example embodiment, the flow rate of the suction fan array 220 is greater than the flow rate generated by the base unit 100.

In operation, the laser projector array 500 operates to project a plurality of laser beams (e.g. 310 as shown in FIG. 1A), controlled by content generation software and laser control software executed on a computer 300, to overlap one or more particulate stream portions (e.g. 141 as shown in FIG. 1A) within the content volume 1000 to generate a desired holographic image. For safety, a laser terminator unit 400 is positioned within the trajectories of the laser beams and outside of the content volume 1000, to absorb and disperse energy associated with the emitted laser beams projected by the laser projector 500.

Figure 3A:
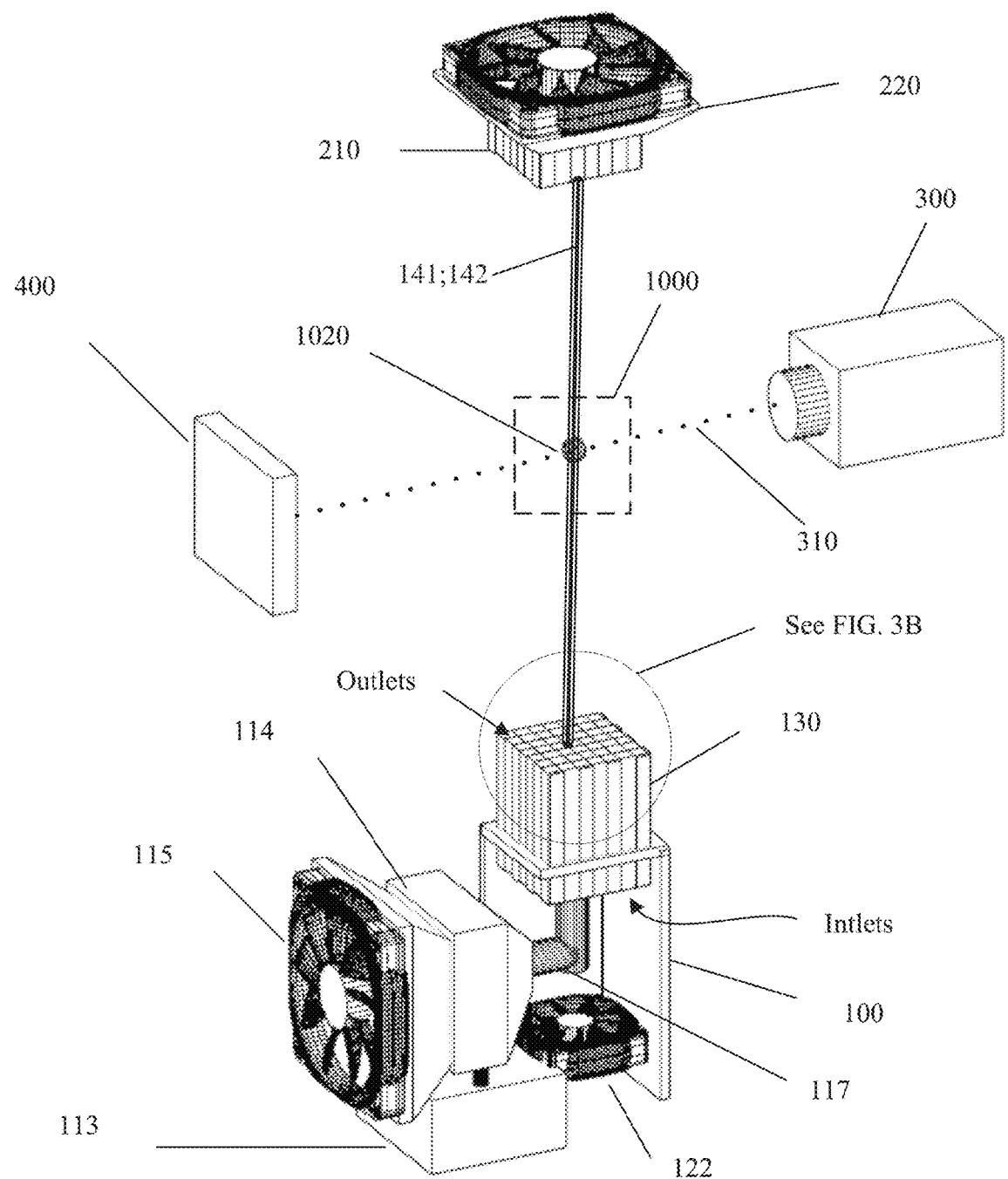
FIGS. 3A-3C illustrate a VAST system layout according to an example embodiment (Embodiment 1) of the present disclosure.
Figure 3B:
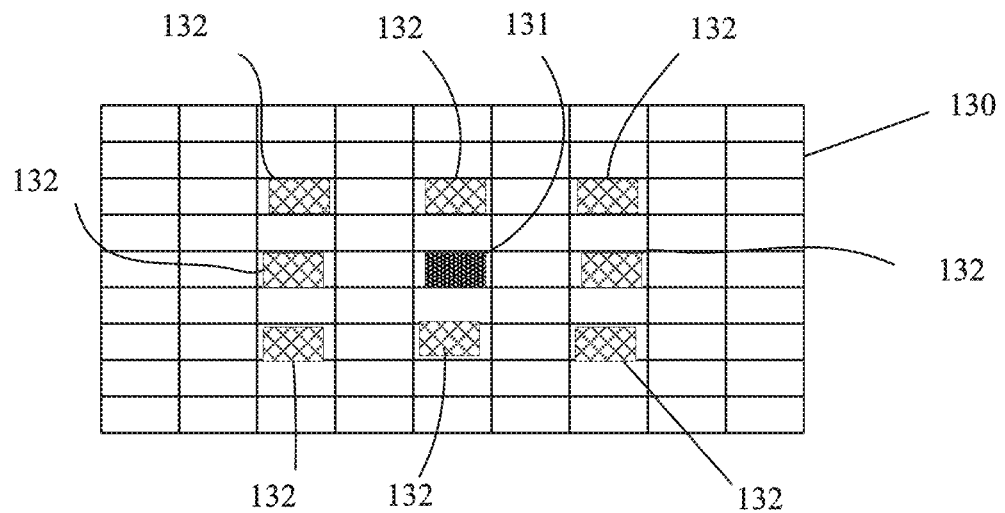
Figure 3C:
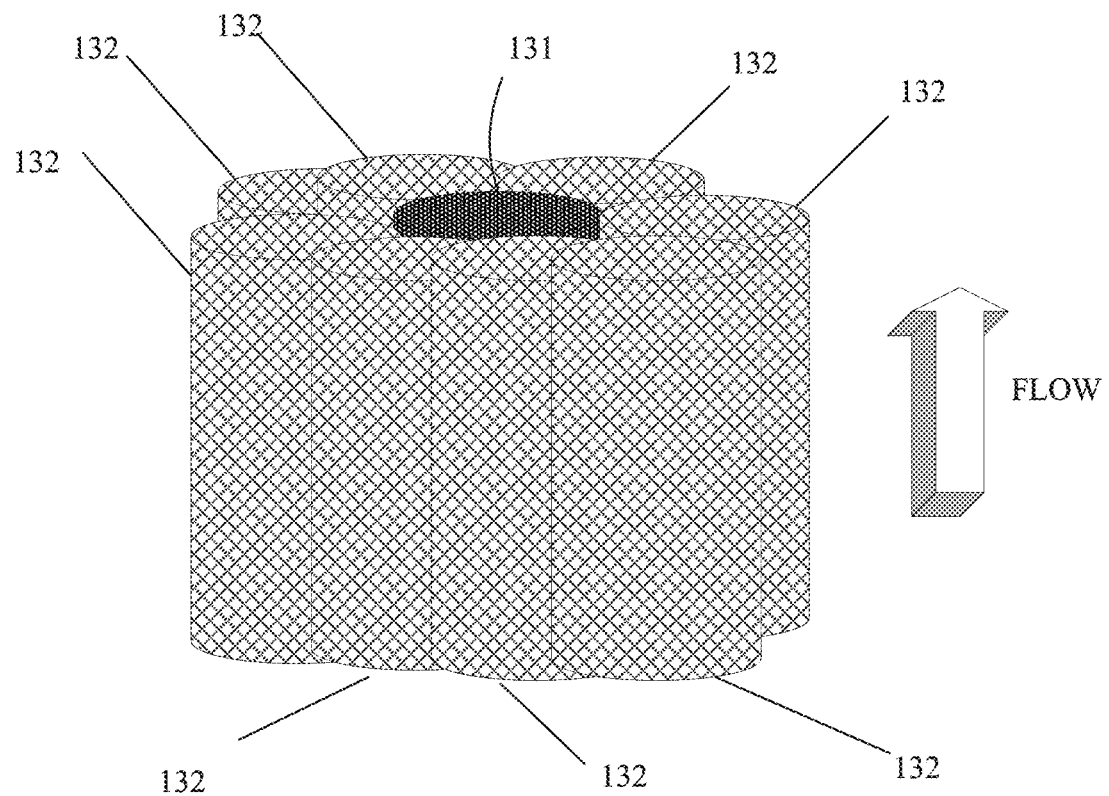

With reference to FIGS. 3A-3C, illustrated is a VAST system 10/20 layout according to an example embodiment (Embodiment 1) of the present disclosure. FIG. 3A shows a layout of a simple VAST system, FIG. 3B shows further details of a laminar flow grid, and FIG. 3C is a detail drawing of a portion of laminar flow within a volumetric display.

As shown, this scaled down VAST system includes a thrust air intake and fan 115, a fluid phase change device 114, a particulate liquid reservoir 113, and particulate piping 117 to grid points on a laminar flow grid 130 to generate a particulate flow. An ionic wind generator 122 generates an atmosphere air flow to the laminar flow grid 130, and the particulate flow and atmosphere flow are combined to produce a laminar columnar flow after the particulate flow and atmosphere flows are propelled from the laminar flow outlets within the volumetric display 1000. A laser diode projector 300 emits a laser beam 142 with a trajectory that overlaps or intersects particulate flow stream 141 to produce an illuminated voxel 1020. For safety, the trajectory path of the laser beam 142 terminates at a laser terminator which absorbs and disperses any energy remaining after passing through the volumetric display 1000.

FIGS. 3B and 3C provide further details of the volumetric display 1000, showing the arrangement of the laminar flow grid flow guide arrangement, as well as the atmosphere air columnar air flow guides 131 and particulate flow guides 132, relative to each other, within the volumetric display 1000.

With reference to FIGS. 4A-4E, illustrated is a VAST system layout according to another example embodiment (Embodiment 2) of the present disclosure.

As shown, this VAST system includes a laser projector or array 300 that projects a plurality of laser beams 310 through a display volume to generate a volumetric image 1030. According to this example embodiment, a bottom unit includes a particulate flow system including a particulate liquid reservoir and phase change device 113;114, a thrust fan/impeller 115, thrust air particulate mix piping 116 and particulate piping to grid points and particulate inlets 117 to a particulate flow guides 132 of the laminar flow grid 130. The base unit atmosphere air flow generation system includes multiple ionic wind generators 122 which propel an atmosphere air flow into the atmosphere air flow guides 131 of the laminar flow grid 130. According to this example embodiment, the particulate flow guides are fluidically isolated from the atmosphere air flow guides by sealing the particulate flow guides at their respective entry points, after insertion of the particulate grid piping/injectors.

Figure 4A:
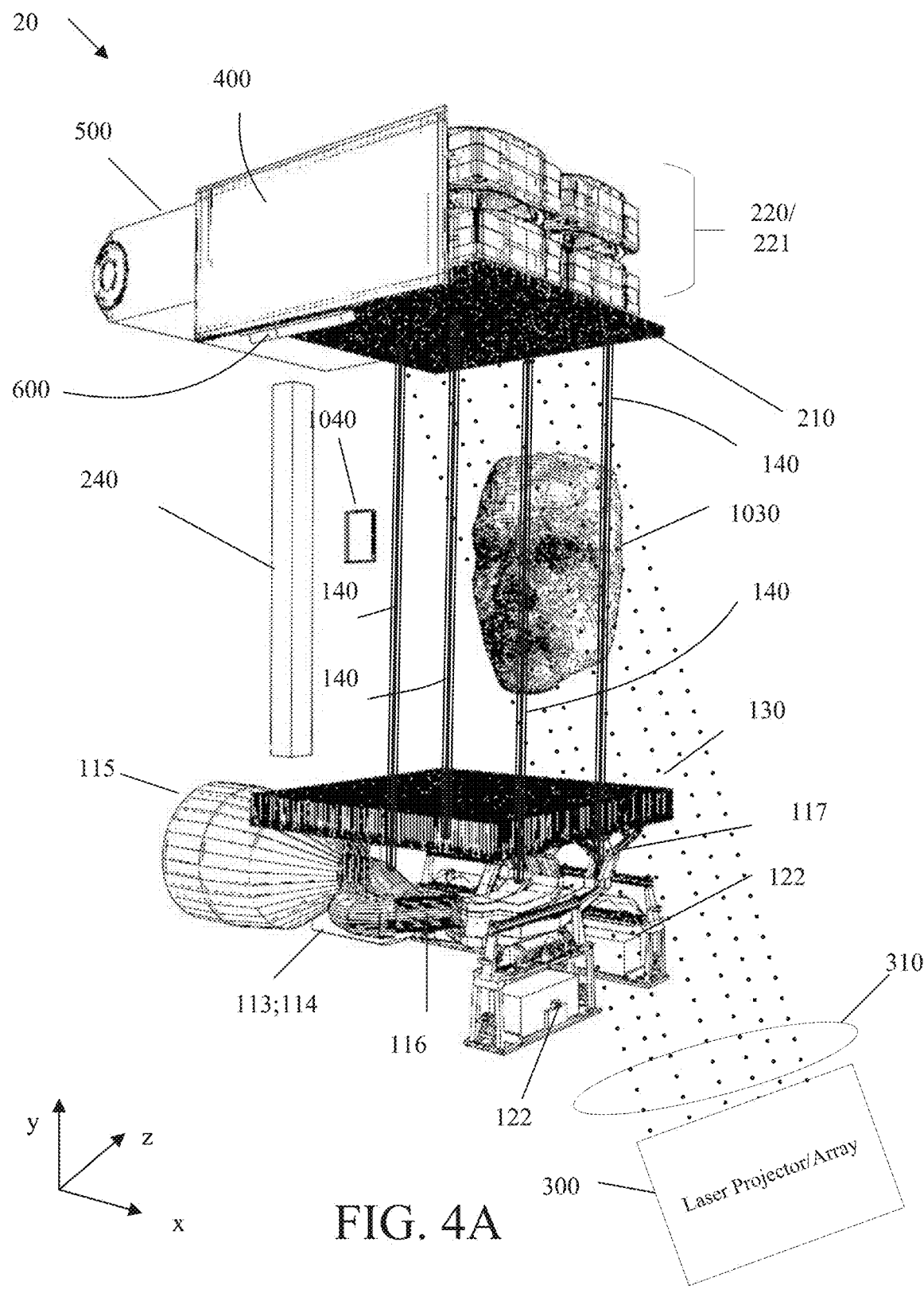
FIGS. 4A-4E illustrate a VAST system layout according to an example embodiment (Embodiment 2) of the present disclosure.

A structural support 240 supports a top unit including a laminar flow grid 210, a suction/vacuum system 220 including an array of suction fans 221, a laser terminating unit 400, an infrared (IR) sensor device 600 and a content and control computer 500 which executes one or more content and control algorithms, etc. to control the VAST system, including communicating either via wires or wirelessly to the laser projector 300, for displaying holographic image 1030 within the display area by overlapping specific laser beams 310 with particulate flows 140. The IR sensor device 600 transmits a spatial interactive content or button 1040 which overlaps with a volumetric display, such as a button, to provide user interactivity with the display. For clarity, only a small sample of the total number of particulate flows 140 and laser beams 310 are shown in FIG. 4A.

Figure 4B:
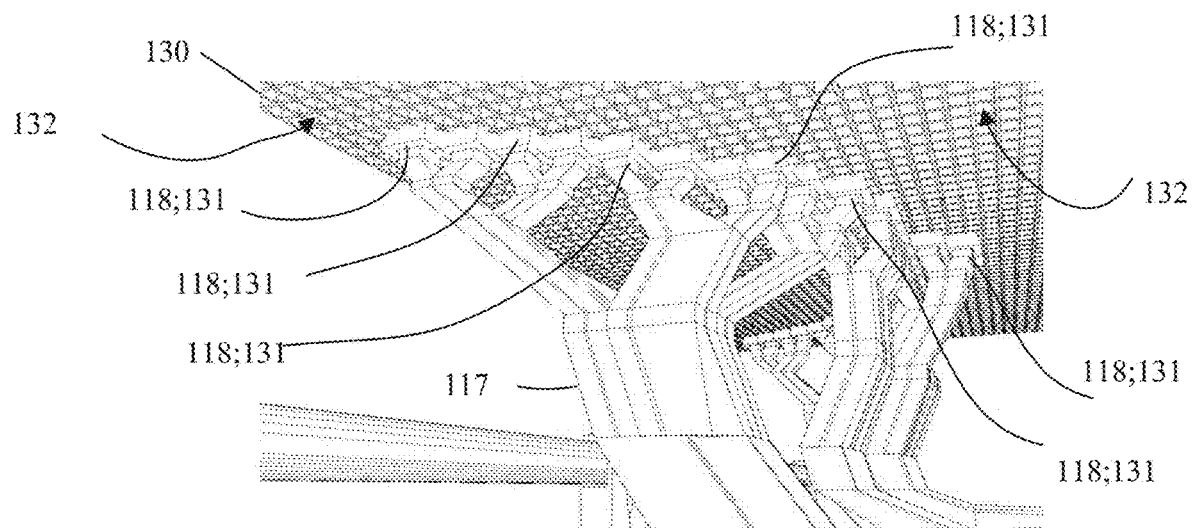
Figure 4C:
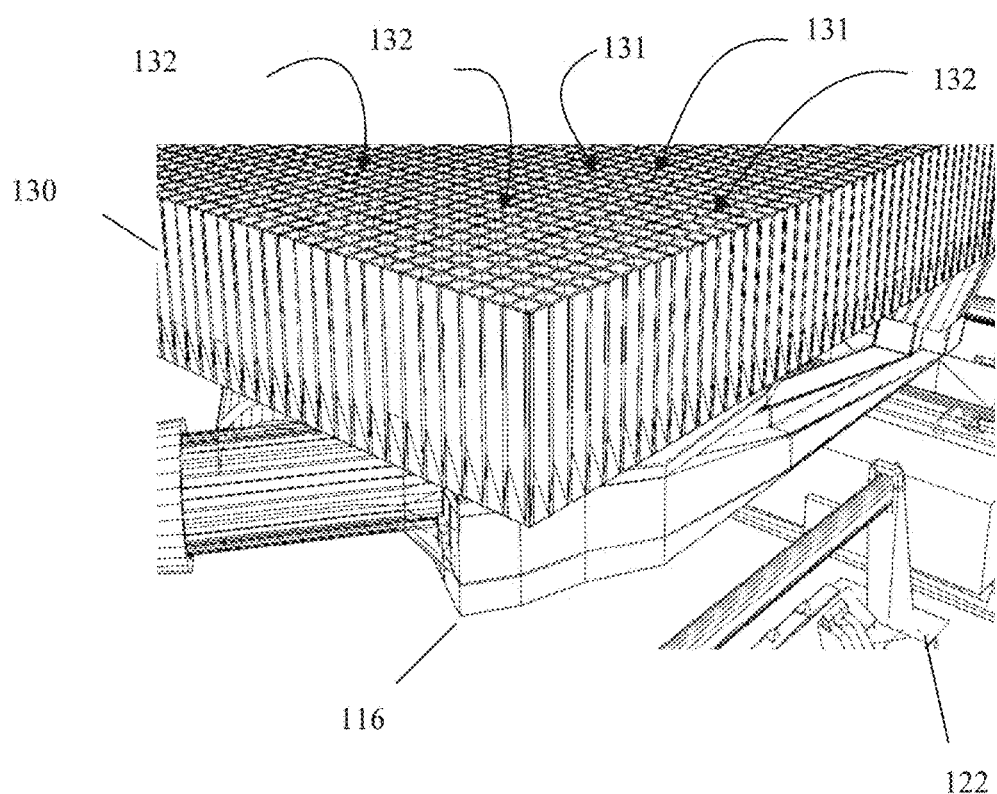
Figure 4D:
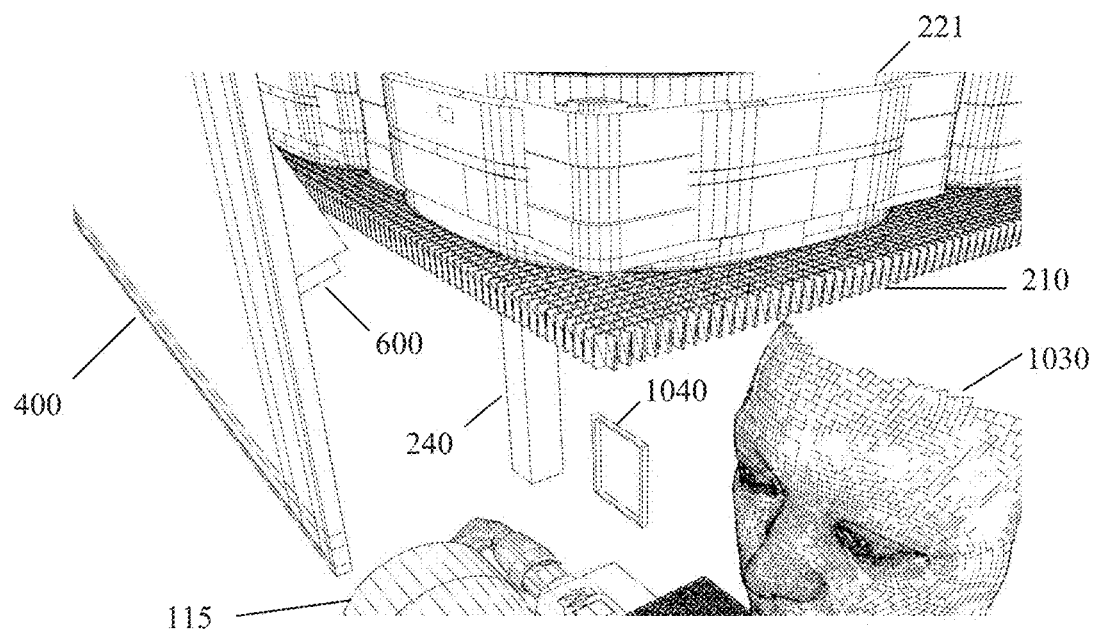
Figure 4E:
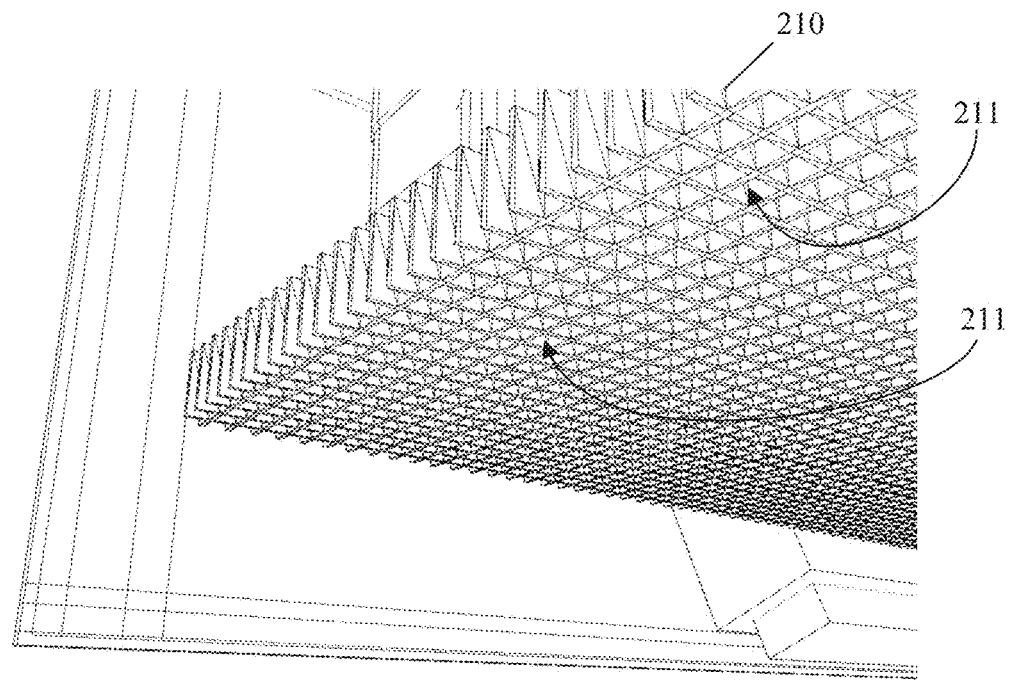

For additional clarity, FIG. 4B is an enlarged perspective view of a portion of underside of the base unit laminar flow grid 130 (only a sample of the particulate inlets 118 are labeled for clarity of the figure), FIG. 4C is an enlarged perspective view of a portion of the base unit laminar flow grid 130, FIG. 4D is an enlarged perspective view of a portion of the volumetric display and top unit, and FIG. 4E is an enlarged perspective view of a portion of the underside of the top unit laminar flow grid 210.

Figure 5A:
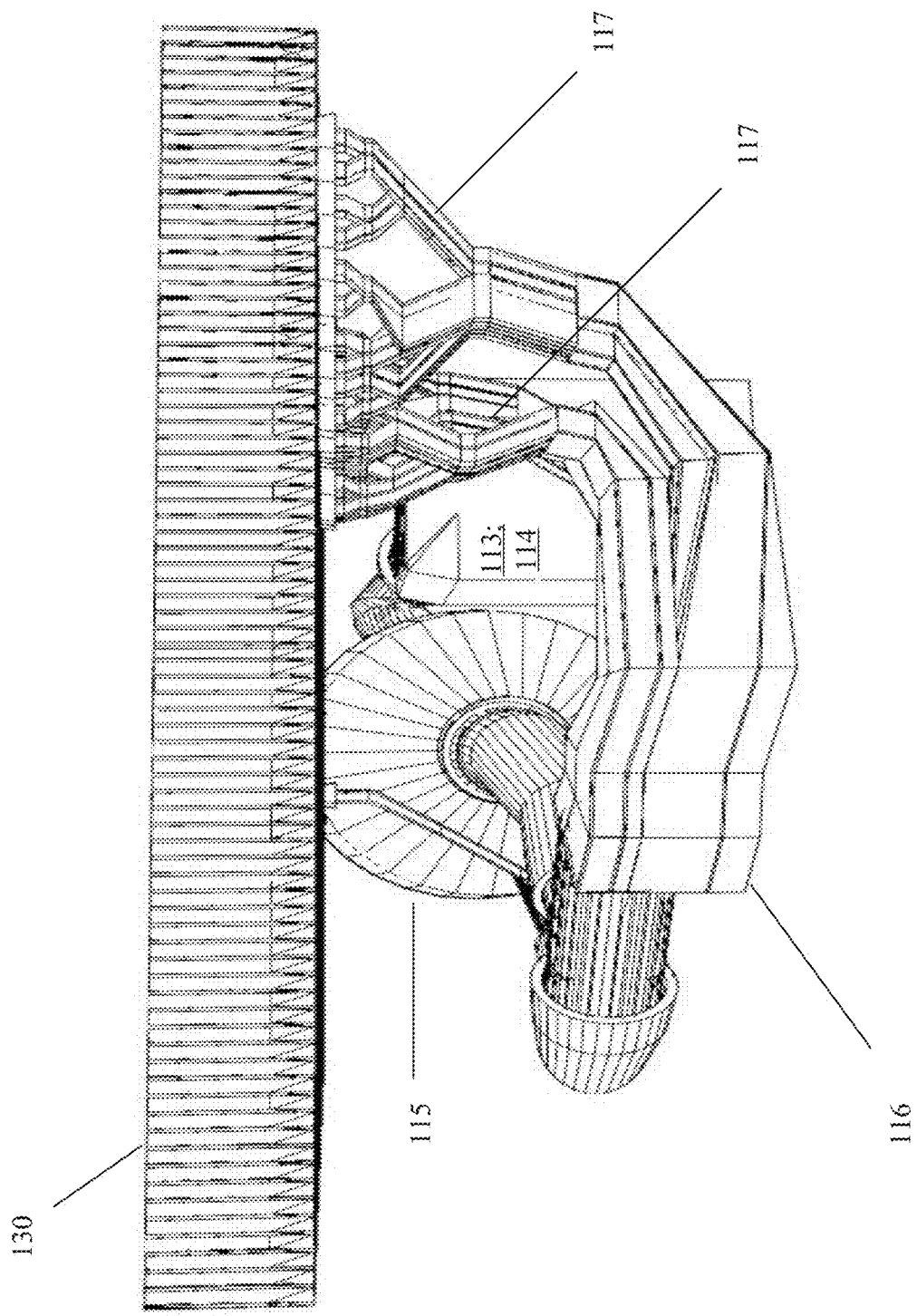
FIGS. 5A-5G illustrates various further views of a VAST system layout according to an example embodiment (Embodiment 2) of the present disclosure.
Figure 5B:
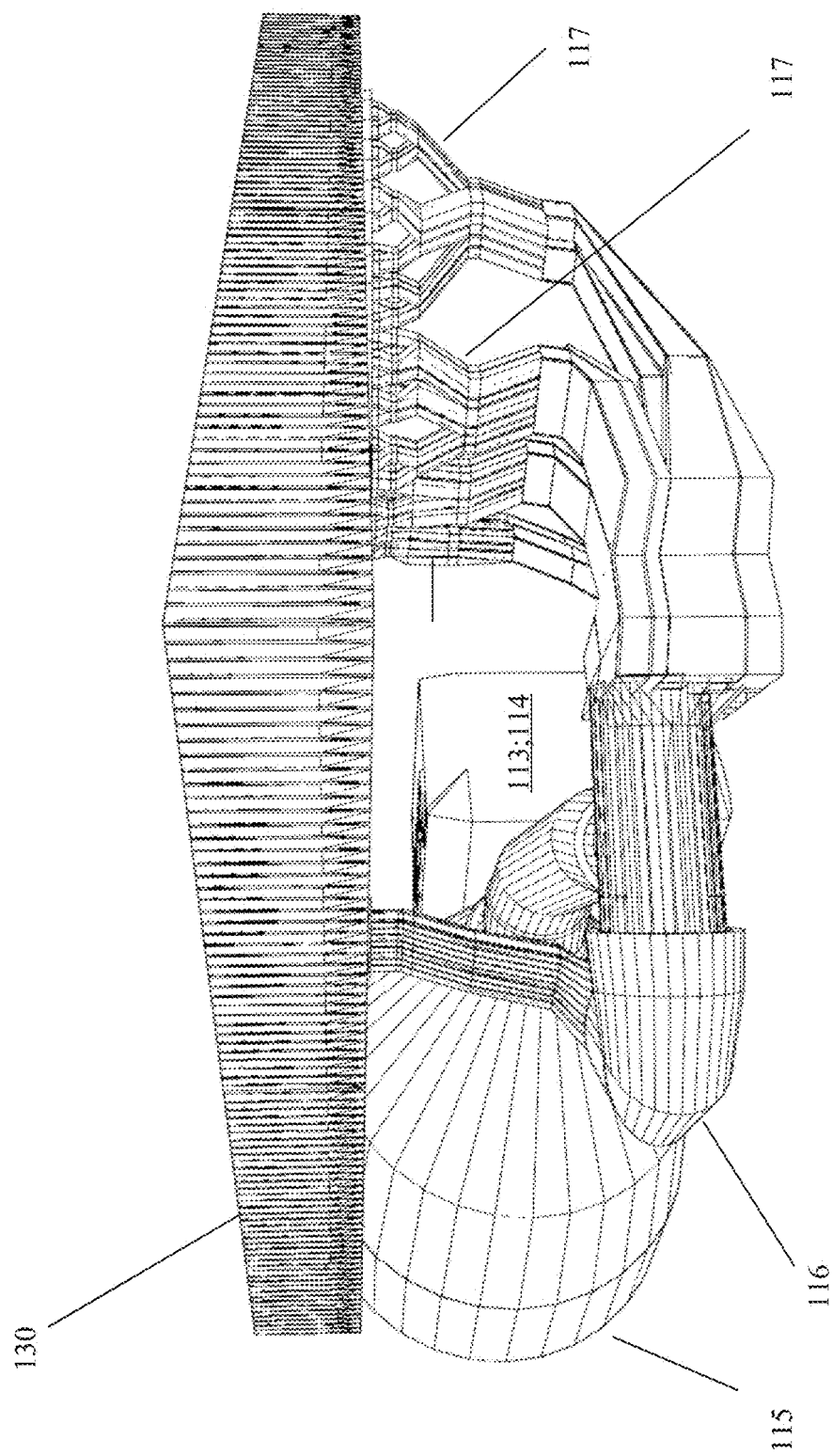
Figure 5C:
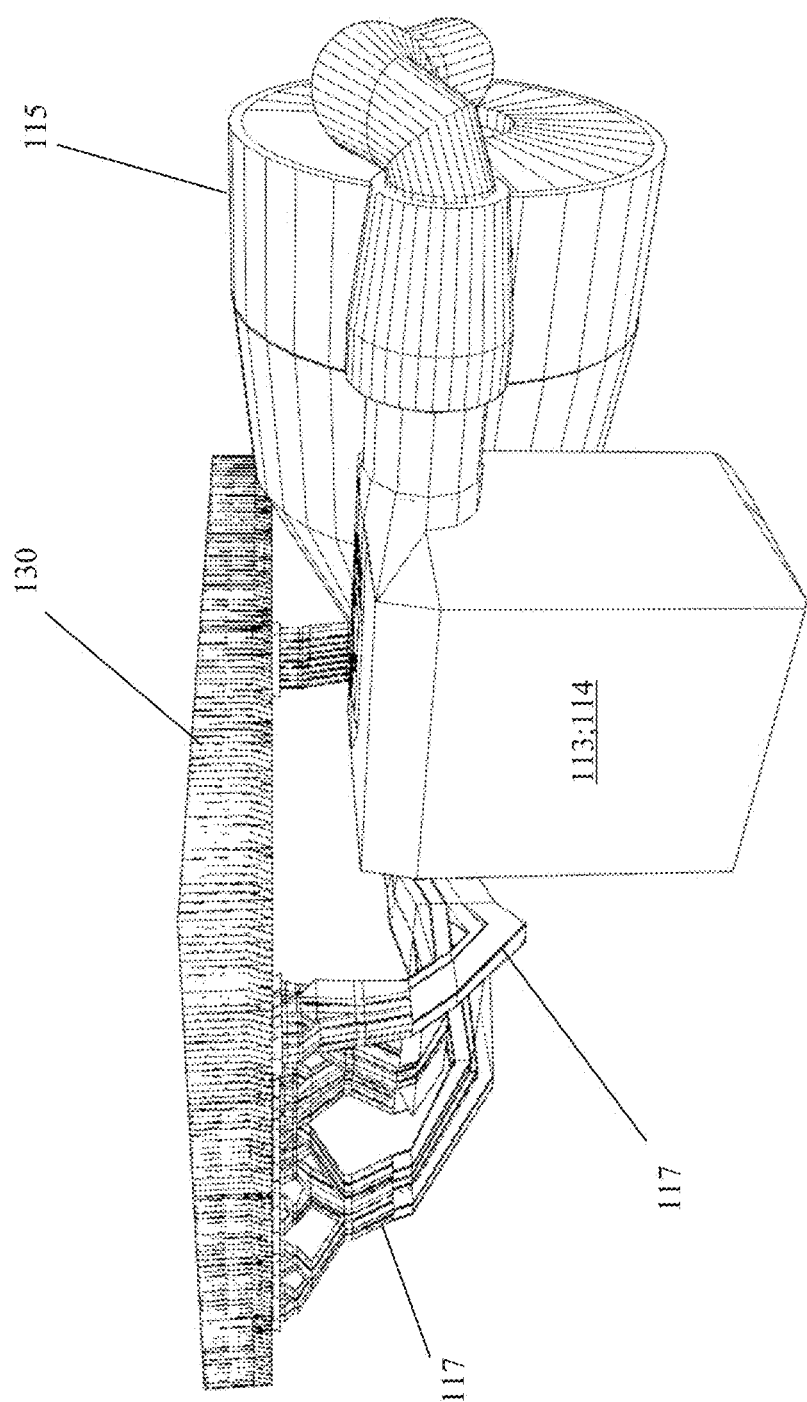
Figure 5D:
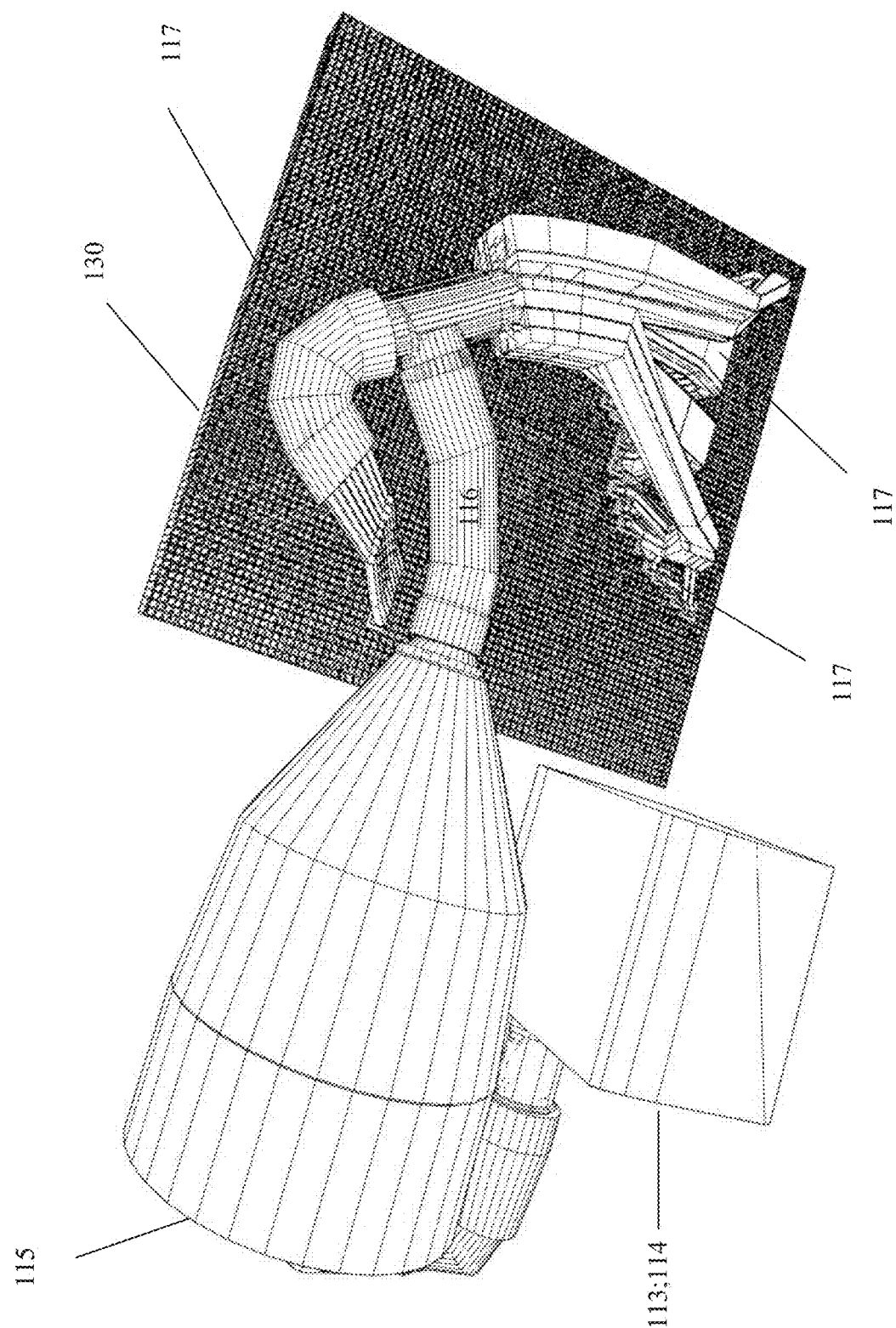
Figure 5E:
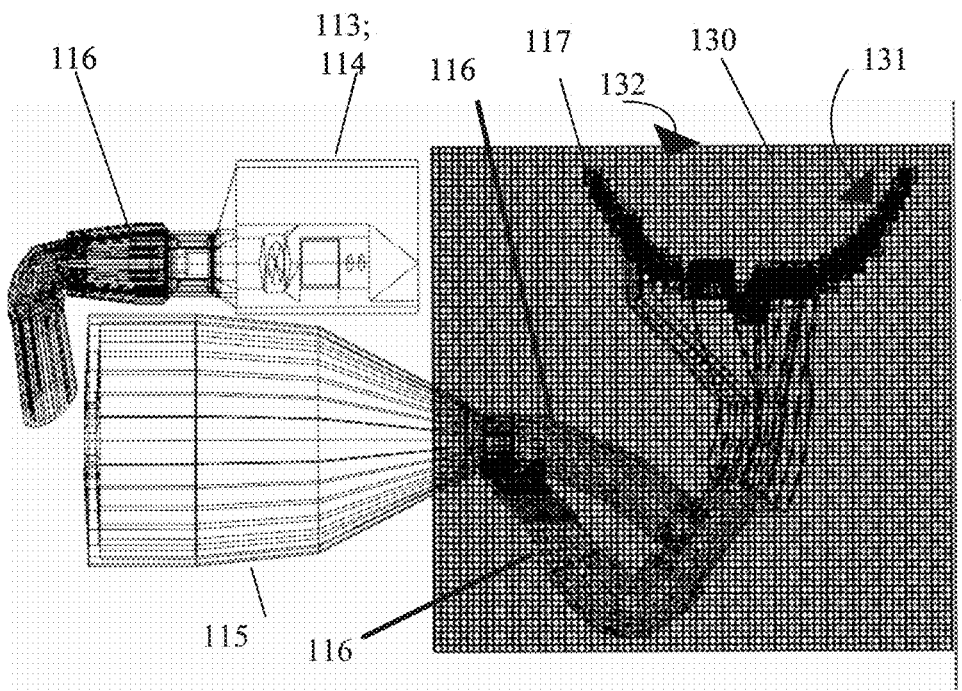
Figure 5F:
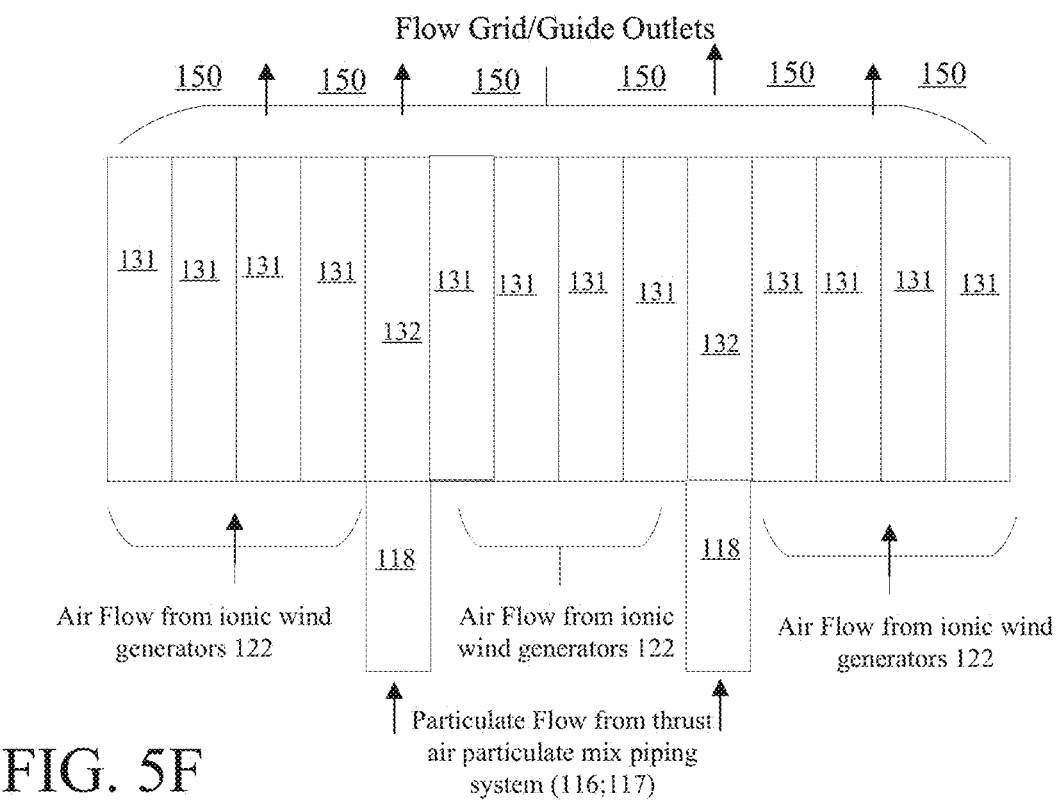
Figure 5G:
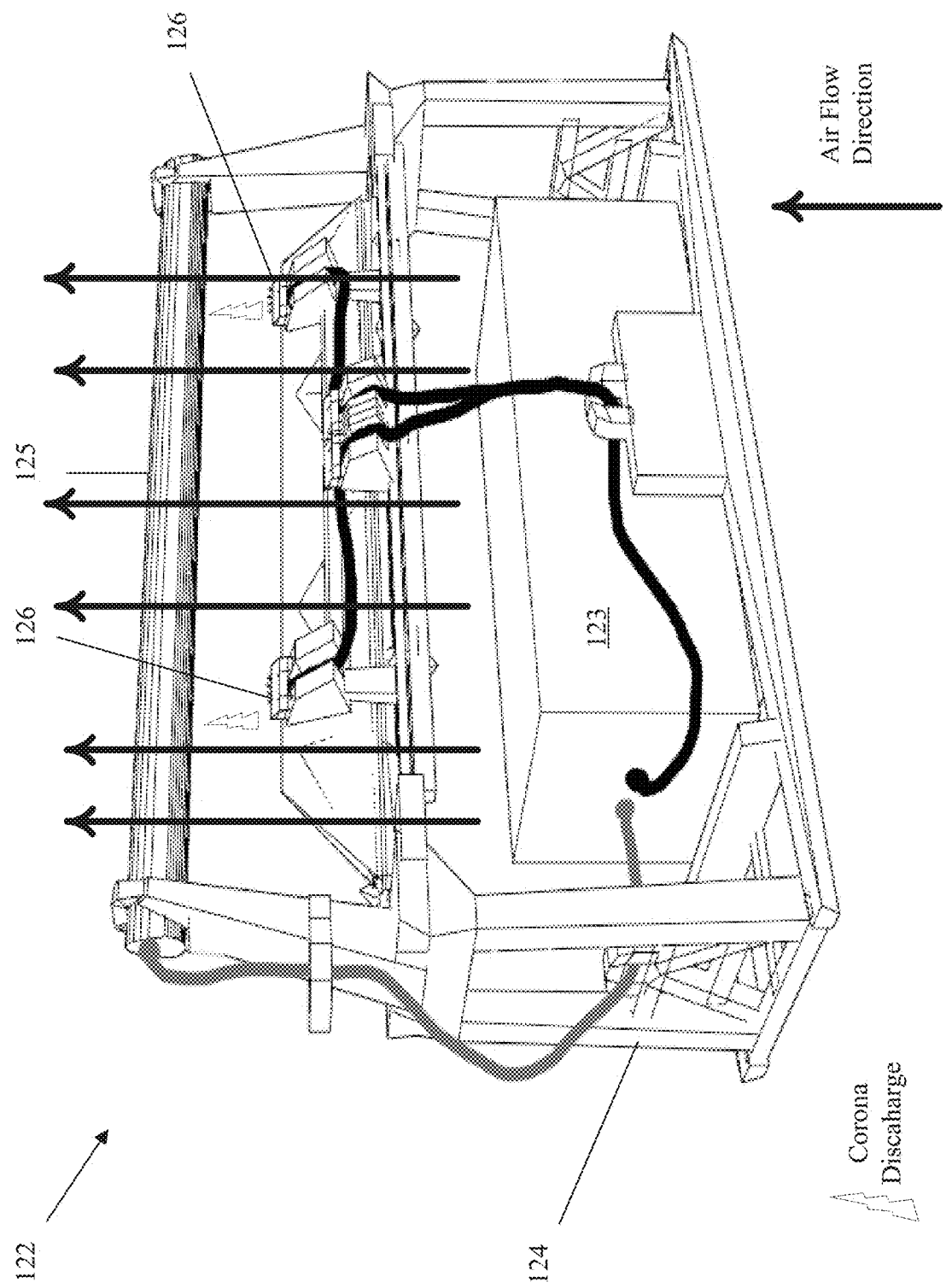

With reference to FIGS. 5A-5G, illustrated are various further views of a VAST system layout according to an example embodiment (Embodiment 2) of the present disclosure. FIG. 5A shows a bottom left perspective view; FIG. 5B shows another bottom left perspective view including the particulate piping; FIG. 5C shows another perspective view showing the combo reservoir and phase change devices; FIG. 5D shows a bottom up perspective view of the combo reservoir and phase change devices, including a main thrust section, particulate piping and a laminar grid; FIG. 5E shows a top down perspective view of the combo reservoir and phase change devices, including a main thrust section, particulate piping and a laminar grid; FIG. 5F shows a detailed example portion/cross sectional view of a portion of the laminar flow grid array, and FIG. 5G is a perspective view of an ionic wind generator, including a high voltage transformer 123, an aerodynamic structure 124, a cathode 125 and anode wires/point slayed tips 126.

With reference to FIG. 5F, it is to be understood this is only a partial end view of an example laminar flow grid arrangement as shown in FIG. 5E. Specifically, shown is an interconnection of the laminar particulate flow guides 131 with the particulate flow from the thrust air particulate mix piping system (116;117), as well as the air flow from ionic wind generators 122 entering the laminar flow grid 130.

With reference to FIG. 5G, during operation of the ionic wind generator 122, airflow is pushed (upward) via inducement from a corona discharge at anode wires 126, where power is supplied to a high voltage transformer 123, the negative anode wire 126 is split into paths of equal length, the end of the anode wire 123 is split into equal length equidistant pointed ends, the wire points are arranged to be equidistant from the wider end of a metal aerodynamic tubing 125 (cathode) along its length, and the transformer positive wire is attached to the aerodynamic tubing 125 to make the entire length of the tubing a cathode. The distance of the wire tips 126 from the aerodynamic tubing 125 must be sufficient to generate a maximal distance corona discharge but not too far to generate an arc discharge when voltage is applied to circuit. As the corona discharge jumps from anode 126 to cathode 125, ionized air particles are propelled by the corona discharge and adjacent air is propelled forward from inducement. All components are sturdily affixed to an aerodynamic support structure 124 in line with the direction of generated air flow.

Figure 6A:
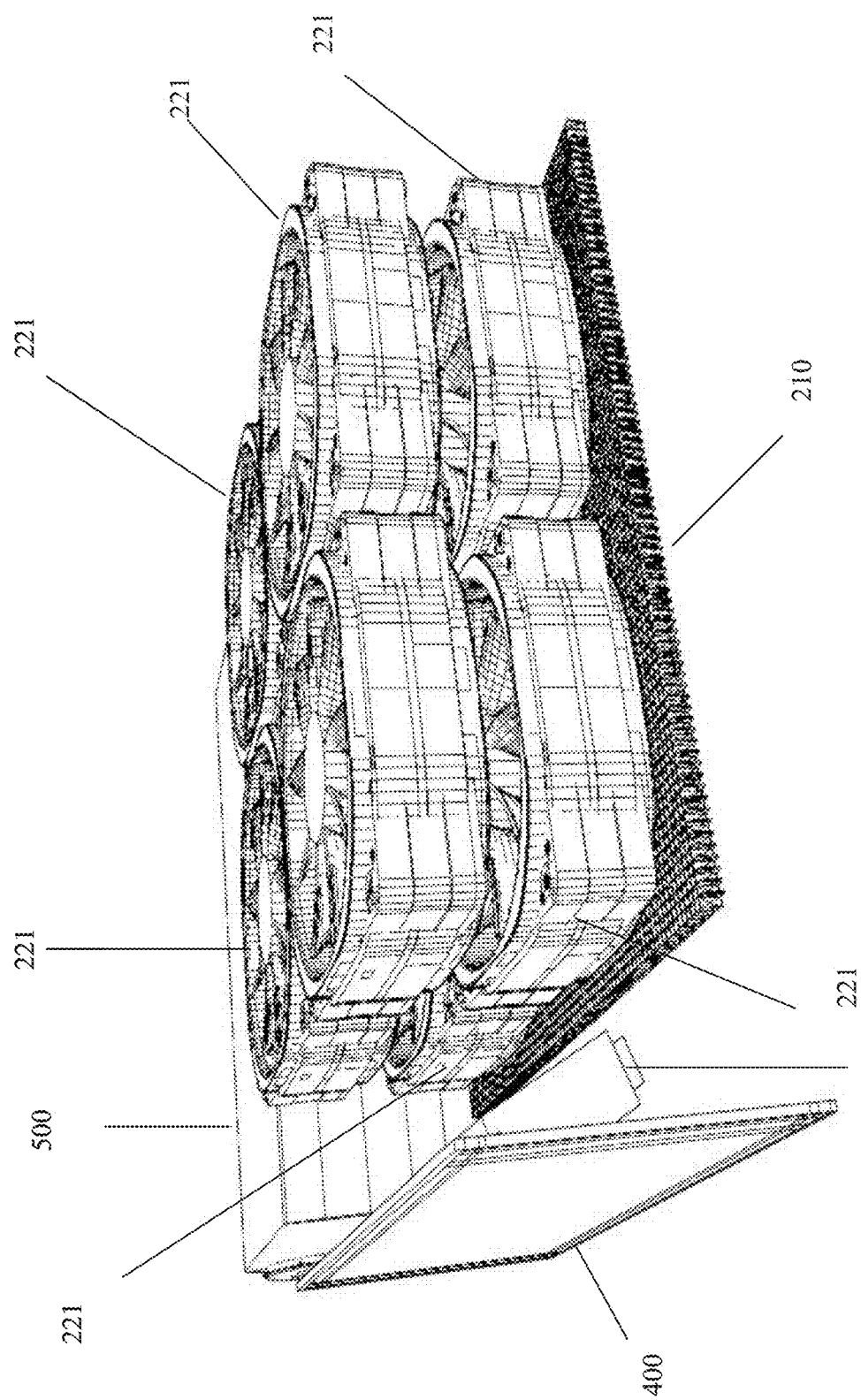
FIGS. 6A and 6B illustrate various details of the atmosphere receive unit systems and subsystems of the volumetric display system (Embodiment 2) according to example embodiments of the present disclosure.
Figure 6B:
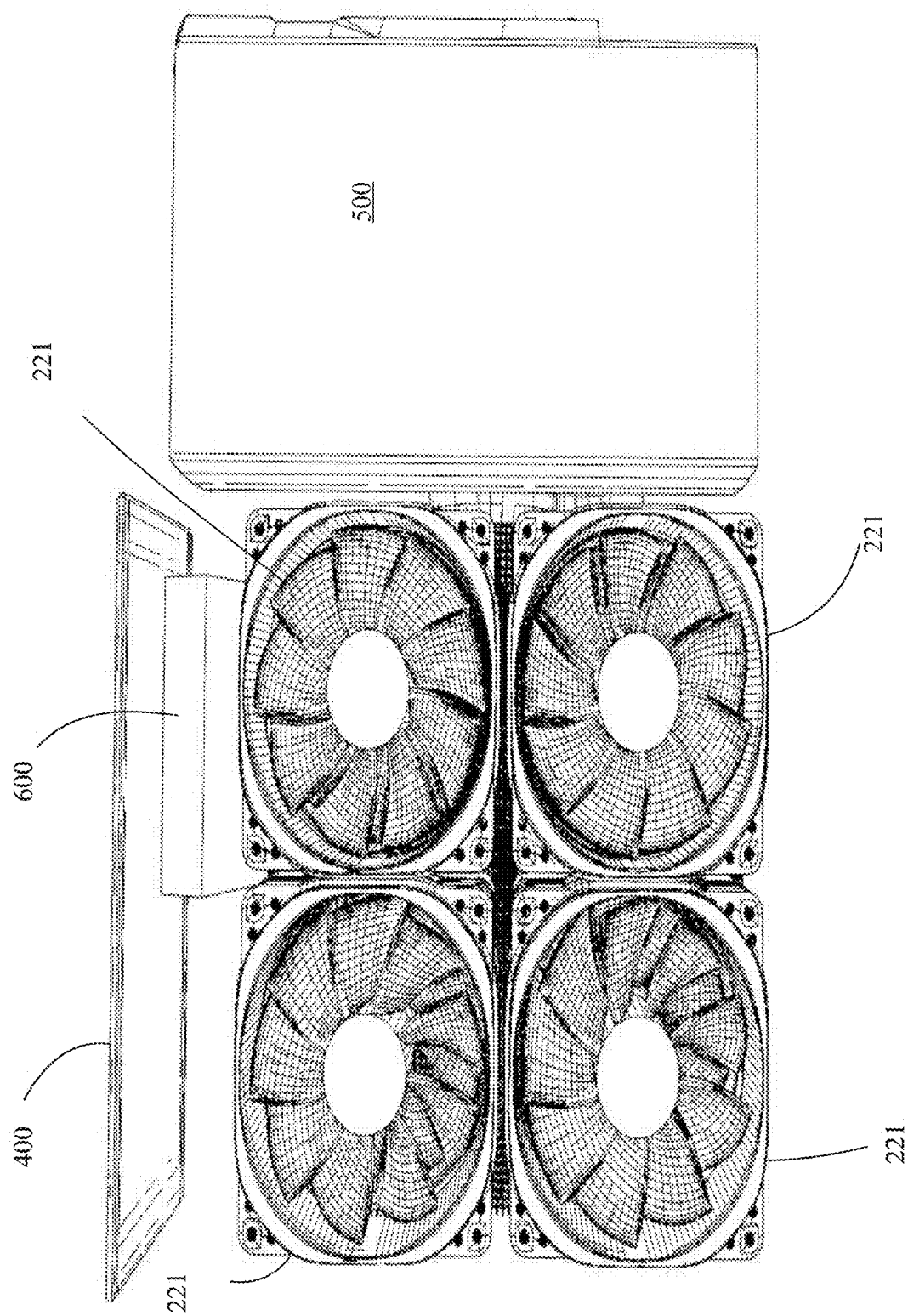

With reference to FIGS. 6A and 6B, illustrated are various details of the VAST atmosphere receive unit systems and subsystems of the volumetric display system (Embodiment 2). FIG. 6A is a top angled view showing the suction fans 221, the laminar grid 210, an IR distance measuring subsystem 600, a laser termination component 400 and a content and control computer 500; and FIG. 6B is a top down view showing the suction fans 221, IR distance measuring subsystem 600, a laser termination component 400 and a content and control computer 500.

In operation, the laminar ducting grid array 210 intakes the columnar laminar combined particulate and atmosphere flow propelled from the send unit (e.g., 140 as shown in FIG. 4A) which travels across the volumetric display area. The suction fans 221 function to provide exhaust/dilution/dispersal output, as well as supplementing the flow of the combined particulate and atmosphere air (e.g., 140 as shown in FIG. 1A) laminarly across the volumetric display. According to an example embodiment, the flow rate of the top unit suction fans 221 is greater than the flow rate of the particular/atmosphere air flow rate of the bottom unit.

Figure 7A:
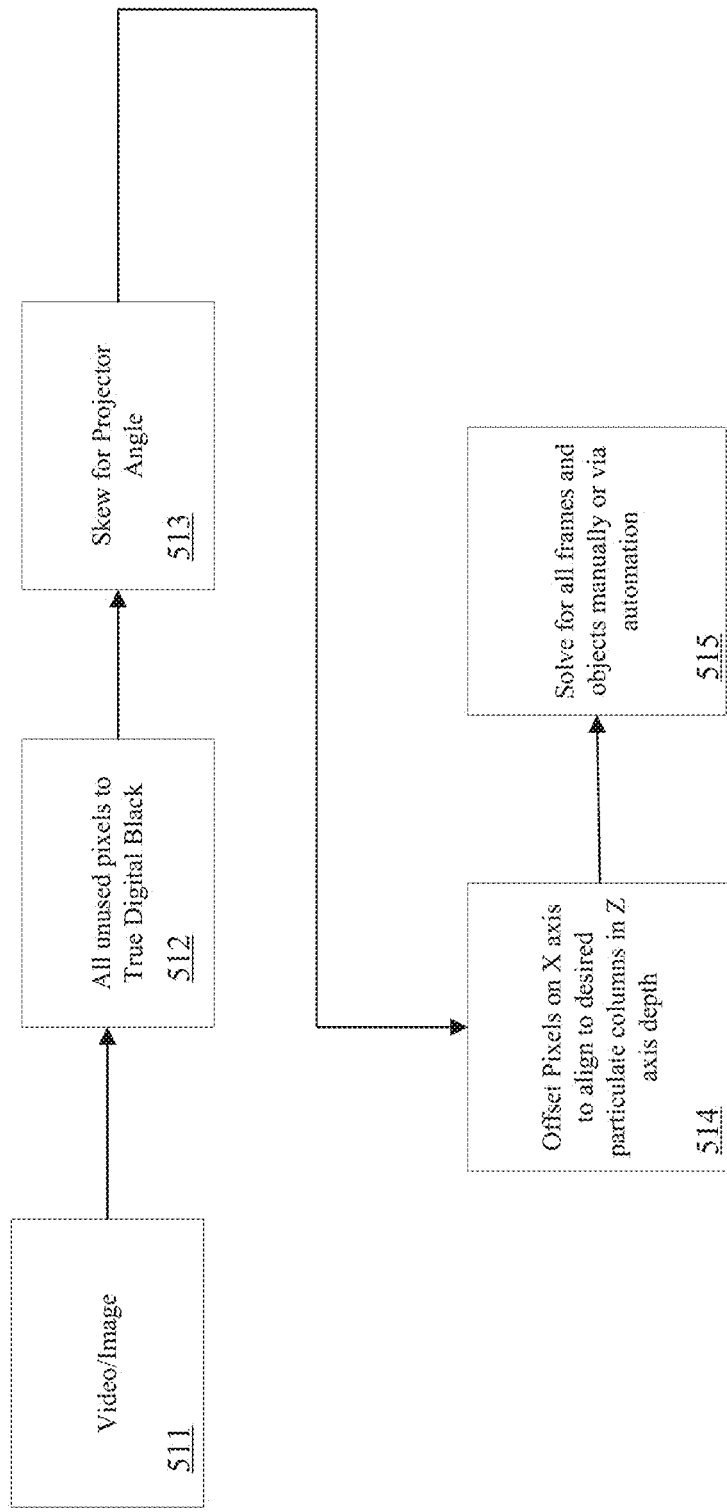
FIGS. 7A and 7B illustrate various details of the content control computer unit to drive the laser output projection system and subsystems of the volumetric display system (Embodiment 2) according to example embodiments of the present disclosure.
Figure 7B:
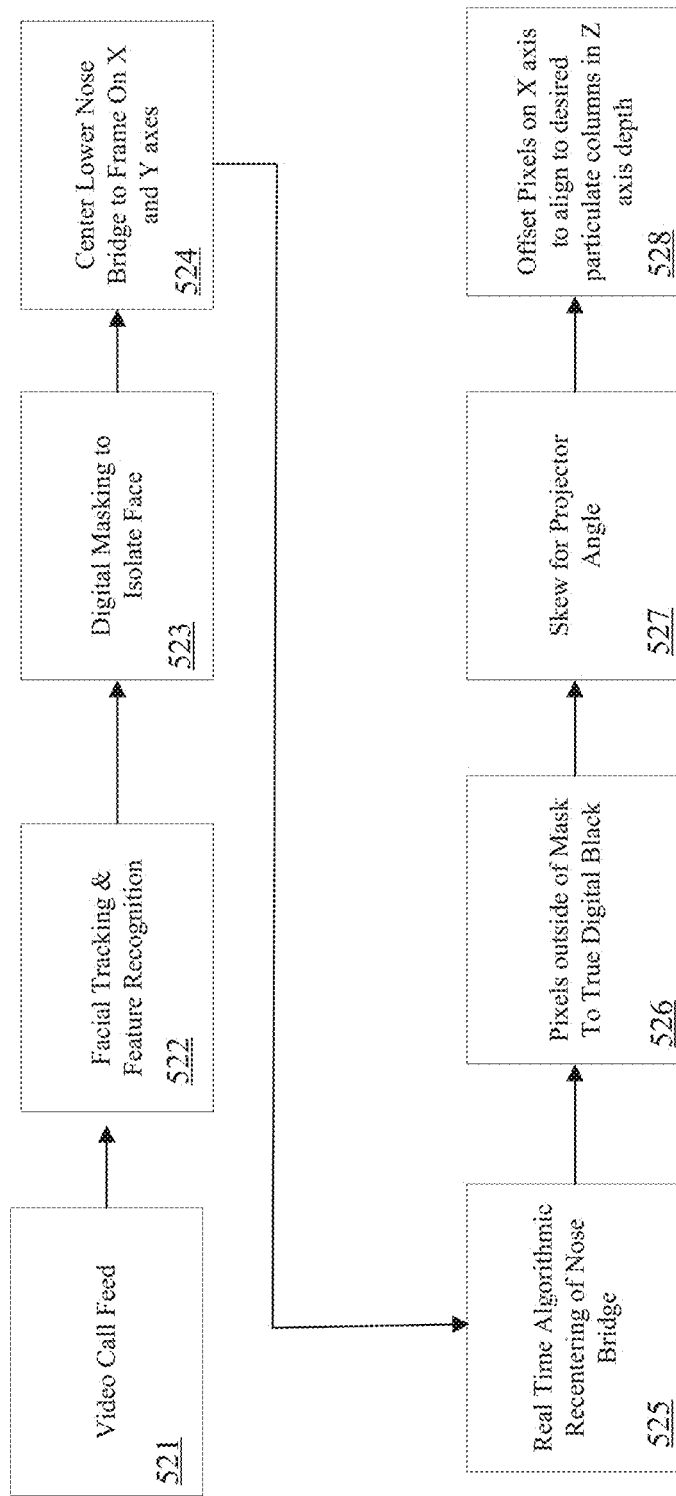

With reference to FIGS. 7A and 7B, illustrated are various details of the content control computer unit to drive the laser output projection system and subsystems of the volumetric display system (Embodiment 2) according to example embodiments of the present disclosure. FIG. 7A is a block diagram of a simple 2D data and content flow generation method/system to generate a volumetric midair hologram, and FIG. 7B is a block diagram of a volumetric video call content flow generation method/system for real time display during a video call.

With reference to FIG. 7A, the general data flow for processing 2D content for display as a 3D volumetric hologram includes the following process steps:
  at step 511, the content generation system acquires a desired video/Image of Object to be displayed in a standard video/image format or other preprocessed format;
  at step 512, all unused pixels are converted to True Digital Black for invisibility in system;
  at step 513, the process skews content output to compensate for projector angle;
  at step 514, the process offsets pixels on the X axis to align to desired particulate columns and sub-columnar positions in the Z axis depth; and
  at step 515, the process solves for all frames and objects manually or via automation and provides a real time feed or premade content for playback. Further processing is performed to link content changes to interactive inputs and sound content.

With reference to FIG. 7B, the data flow for a volumetric video call content flow generation method/system for real time display during a video call includes the following process steps:
  at step 521, the content generation system receives a video call input feed, such as but not limited to ZOOM or other video call platform;
  at step 522, the content generation system performs a facial tracking & feature recognition algorithmic process (via TOUCHDESIGNER or similar/proprietary software);
  at step 523, the content generation system performs a digital masking process to isolate the face;
  at step 524, the content generation system center performs a process to lower the nose bridge target pixel to a frame on the X and Y axes;
  at step 525, the content generation system real time performs algorithmic processing to recenter feed based on target pixel(s) correlating to the lower nose bridge;
  at step 526, the content generation system coverts pixels outside of the mask to true digital black for real world invisibility;
  at step 527, the content generation system performs a process to skew the content output to compensate for the laser projector angle; and
  at step 528, the content generation system performs a process to offset pixels on the X axis to align to desired particulate columns and sub-columnar positions in the Z axis depth Additional processing steps after step 528 may include: linking the real time feed system to interactive inputs and sound content ("end call" button etc.); routing incoming call audio feed to system speaker outputs, routing camera & microphone feeds into the VAST system with camera angled toward user to coincide with floating caller hologram line of sight to create direct naturalistic conversation with caller present as floating volumetric laser hologram.

According to an example embodiment of this disclosure operating as described with reference to FIGS. 4-7, an operating VAST system includes the following functional attributes/specifications:
A) Volumetric Holographic Display Attributes/Specifications
  A volume hologram display resolution of 343,440 simultaneous voxels;
  60 hz refresh rate (halving the resolution can provide as basis to increase refresh rate to 120 hz);
  ~1750 lumens (~510 Nits) of brightness;
  53 vertical particulate columns, 2 mm×2 mm each;
  average 3×2160 voxels for each particulate column; and
  ~0.7 mm voxel diameter with gaussian fall off in physical real world space;
B) Particulate Flow and Surrounding Airflow in Display Volume Attributes/Specifications
  4-7 meters per second capable at grid exit;
  3-5 m/s in center of volume; and
  3-4 m/s suction at top of volume grid, 4 m/s at top exit.
C) Main Thrust Impeller Attributes/Specifications
  Iintake ~7 meters a second;
  ~4" diameter impeller with ~1" diameter piping split to (5) 0.75" ducts which split as evenly as possible into 53 individual 2 mm outlets corresponding to desired grid points; and housings, connectors, and piping for particulate flows made from high temperature resistant cured resin material and high temp resistant gasoline pump hose.
D) Laminar Flow Grid Attributes/Specifications
  2 grids (1 top and 1 bottom above and below display volume);
  2 mm square outlets in grid, 0.5 mm walls;
  200 mm×200 mm grid, height top grid is 8 mm, height bottom grid is 16 mm, bottom grid has 3 mm protrusions for piping connectors underneath;
  80×80 grid, 6,400 column hole outlets per grid; and
  high temperature resistant cured resin material.
E) Structure Attributes/Specifications
  16.75" wide×22" tall×11" deep top+bottom+volume;
  2" structural steel bar to hold up top unit;
  bottom 16.75" wide×5.5" tall×11" deep;
  top 16.75" wide×5" tall×11" deep;

laminar air flow display volume 200 mm×200 mm×30.5 cm (~8"×8"×12"); and steel and aluminum structural elements with some plastic connectors, internal absorbent gauze lining for hypothetical moisture leakage, and soundproof foam wall lining layer to mitigate fan noise, under steel outer shell casing.

F) Phase Change and Reservoir Attributes/Specifications

~10 ml reservoir;

glycol and water-based fluid mixture;

4.5"×2"×1.5" combo reservoir, phase change, and air intake; and particulate ejects to high thrust air intake which mixes turbulently before entering particulate piping.

G) Ionic Wind Module Attributes/Specifications

4" wide×2.5" tall×1.25" deep;

2-3 meters per second wind;

200,000 volt high voltage transformer designed for taser units;

0.25"×4" streamline aerodynamic aluminum tubing oriented vertically (teardrop);

1 cm distance between anode wire tips and cathode aluminum tubing;

vertically aerodynamic structure made of high temperature resistant cured resin material;

up to 4 modules in system in bottom unit below grid; and optional fans in addition or in place of ionic wind generation modules.

H) Laser Projectors Attributes/Specifications

SONY VPL-XW5000ES 4K HDR Laser Home Theater Video Projector; and X-LASER LASERCUBE 1.5 W scanner type beam show laser.

I) Laser Terminator

Laser Terminator includes an inner wall lining made of cinefoil matte black high temp resistant light absorbing aluminum substrate.

Figure 8A:
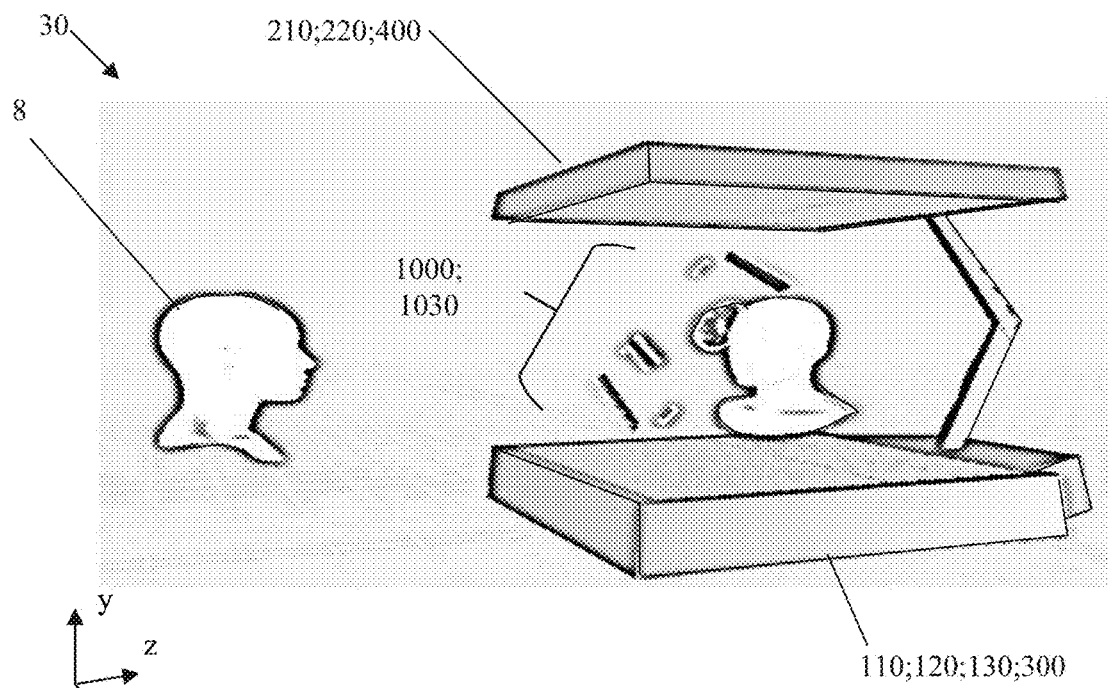
FIGS. 8A and 8B illustrates a volumetric display system (Embodiment 3) according to example embodiments of the present disclosure.
Figure 8B:
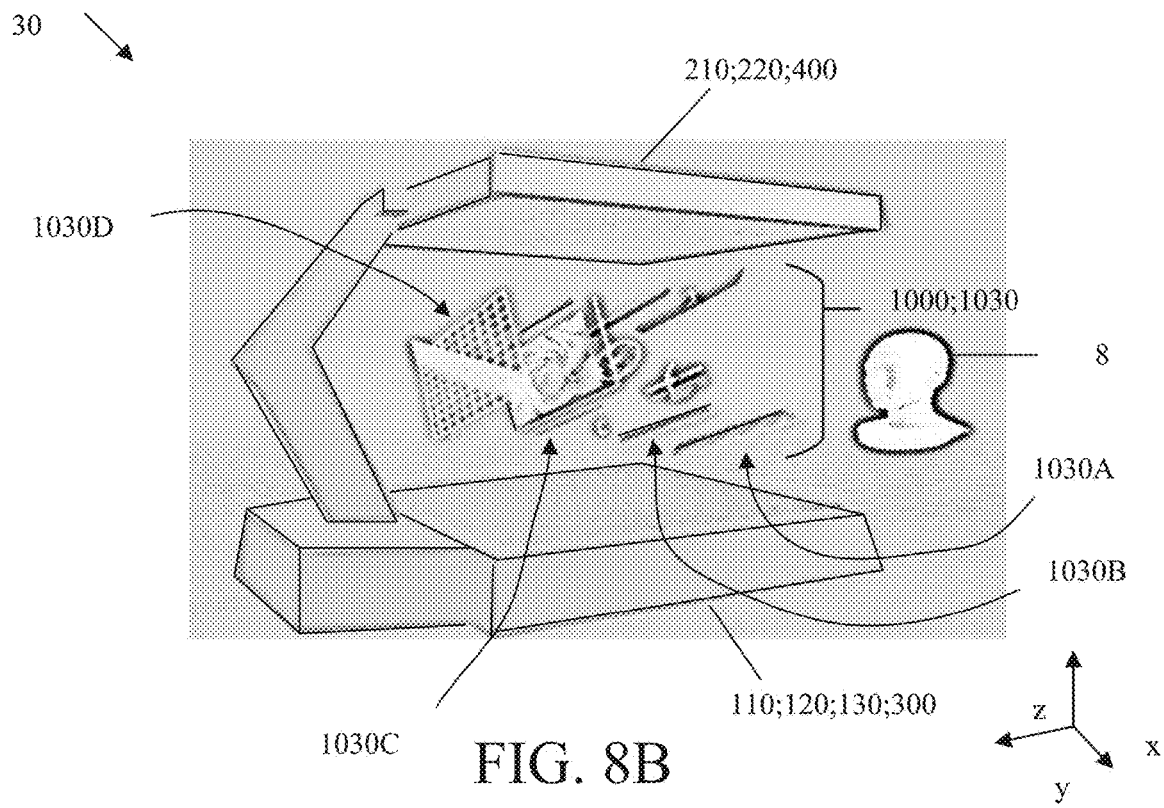

With reference to FIGS. 8A and 8B, illustrated is a volumetric display system (Embodiment 3) 30 according to example embodiments of the present disclosure.

As shown, this VAST system includes a base unit 110; 120;130;300 which integrates the functionality of the particulate flow generator 110, columnar flow generator 120, laminar flow grid 130 and laser projector array as previously described, to provide an invisible display volume invisible display volume with holographic content/floating content 1000;1030 for viewing by a user 8. The VAST system further includes a top unit 210;220;400 which integrates the functionality of the laminar ducting grid array 210, suction/vacuum system 220 and laser termination 400.

Regarding the holographic content/floating content 1000; 1030, as shown, the displayed voxel image is comprised of a plurality of layered images 1030A-D, stacked in the Z direction to generate a single perceptible image from the user's 8 vantage point.

Figure 9:
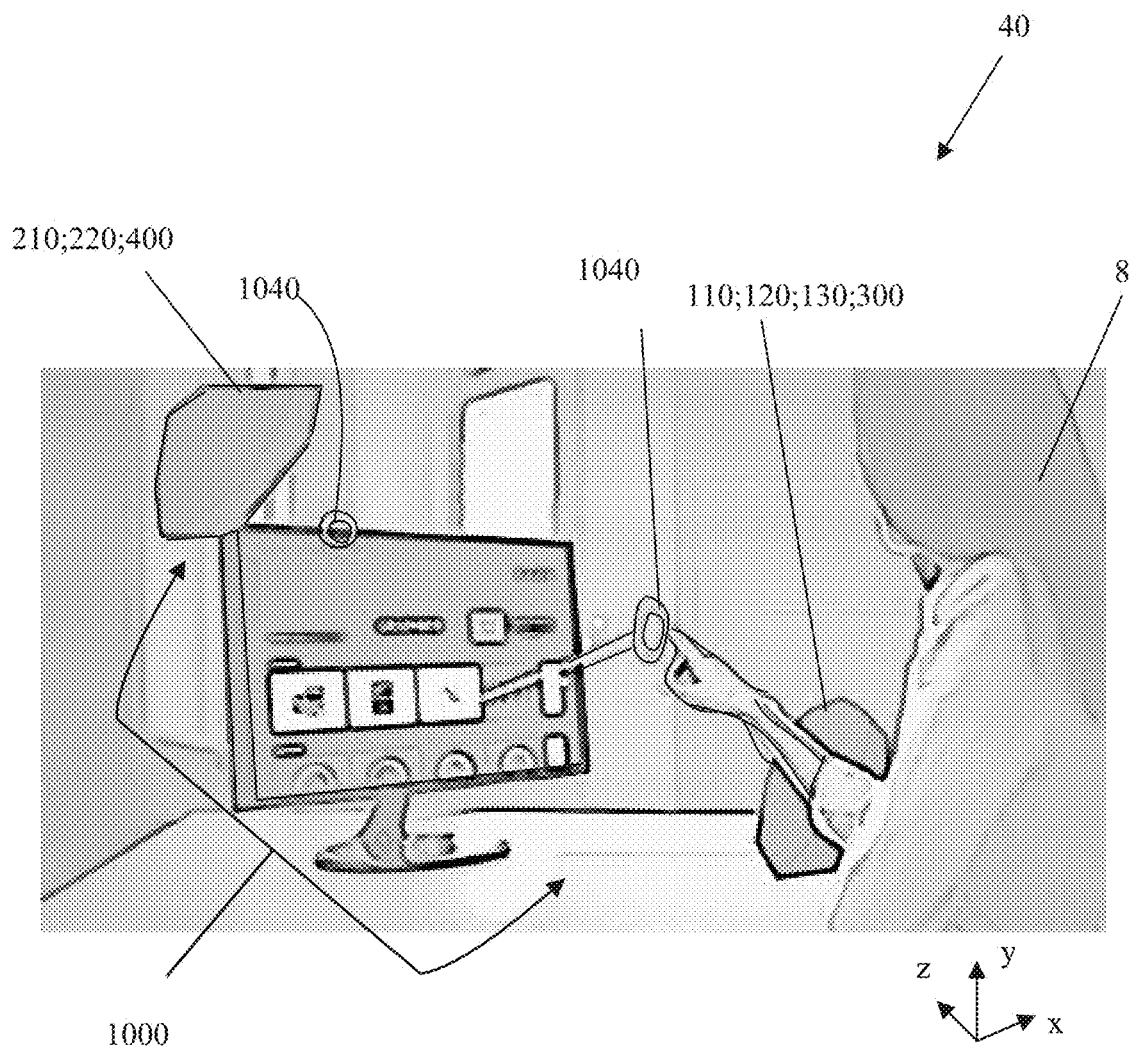
FIG. 9 illustrates a volumetric display system (Embodiment 4) according to example embodiments of the present disclosure. According to this embodiment, the system includes hologram light object presence telecoms for use in a home, enterprise, artistic, and/or municipal application. Features include hologram light object interaction enhancement or collaborative augmentations hybrid systems for use in home, enterprise, artistic, and municipal environments.

With reference to FIG. 9, illustrate is a volumetric display system (Embodiment 4) 40 according to example embodiments of the present disclosure. According to this embodiment, the system includes hologram light object presence telecoms for use in a home, enterprise, artistic, and/or municipal application. Features include hologram light object interaction enhancement or collaborative augmentations hybrid systems for use in home, enterprise, artistic, and municipal environments.

As shown, this VAST system includes a right lower base unit 110;120;130;300 which integrates the functionality of the particulate flow generator 110, columnar flow generator 120, laminar flow grid 130 and laser projector array as previously described, to provide an invisible display volume invisible display volume with holographic content/floating content 1000; 1030 and for a user 8. The VAST system further includes an upper left top unit 210;220;400 which integrates the functionality of the laminar ducting grid array 210, suction/vacuum system 220 and laser termination 400. In addition an IR sensing module is integrated in the upper left top unit to provide spatial interactive content 1040.

Figure 10:
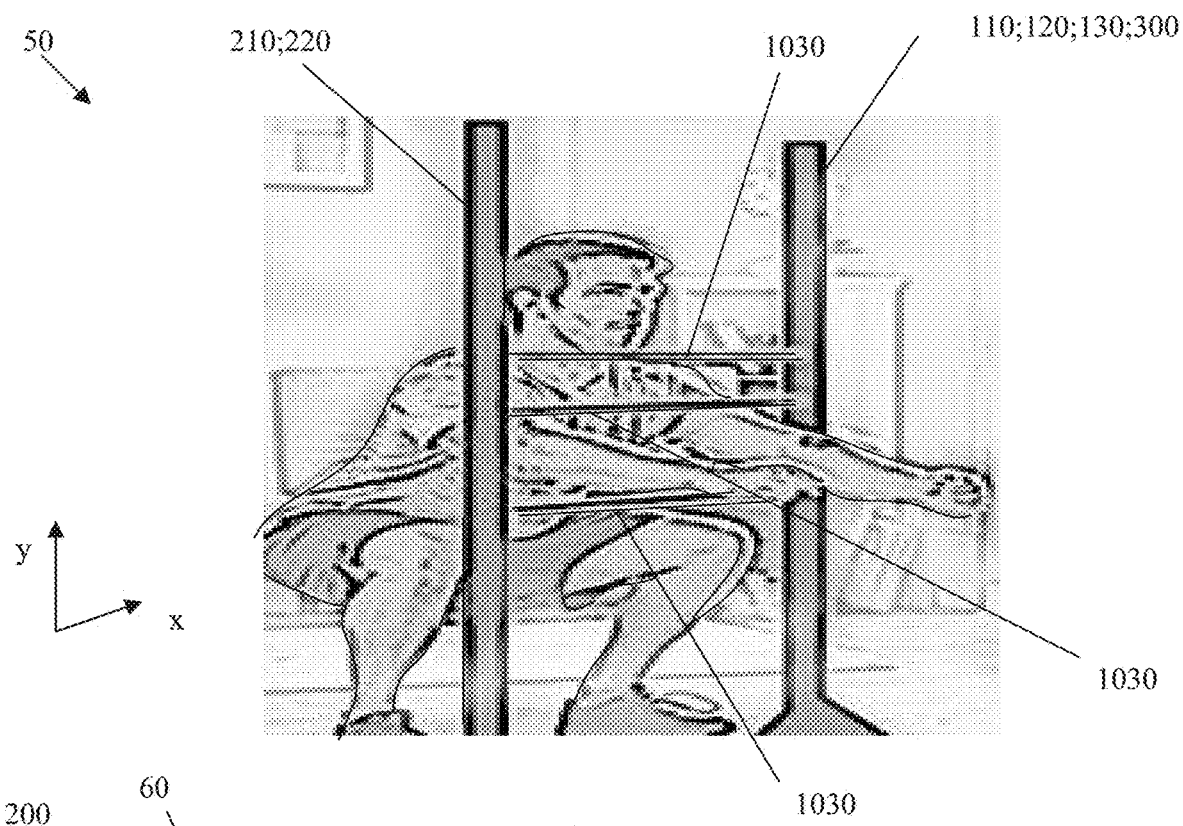
FIG. 10 illustrates a volumetric display system (Embodiment 5) according to example embodiments of the present disclosure, including a VAST system for hologram therapeutic, exercise or training with data and feedback for use in a home, enterprise, artistic, and municipal environments.

With reference to FIG. 10, illustrates is a volumetric display system (Embodiment 5) 50 according to example embodiments of the present disclosure, including a VAST system for hologram therapeutic, exercise or training with data and feedback for use in a home, enterprise, artistic, and municipal environments.

As shown, this VAST system includes a right post or base unit 110;120;120;130;140;300 which integrates the functionality of the particulate flow generator 110, columnar flow generator 120, laminar flow grid 130 and laser projector array 300 as previously described, to provide an invisible display volume with holographic content/floating content 1000; 1030 for a user 8. The VAST system further includes a upper post top unit 210;220;400 which integrates the functionality of the laminar ducting grid array 210, suction/vacuum system 220 and laser termination 400. According to this example embodiment, one or more laser beams and laminar column particulate flows substantially overlap longitudinally to provide a "bar" type holographic voxel image 1030.

Figure 11:
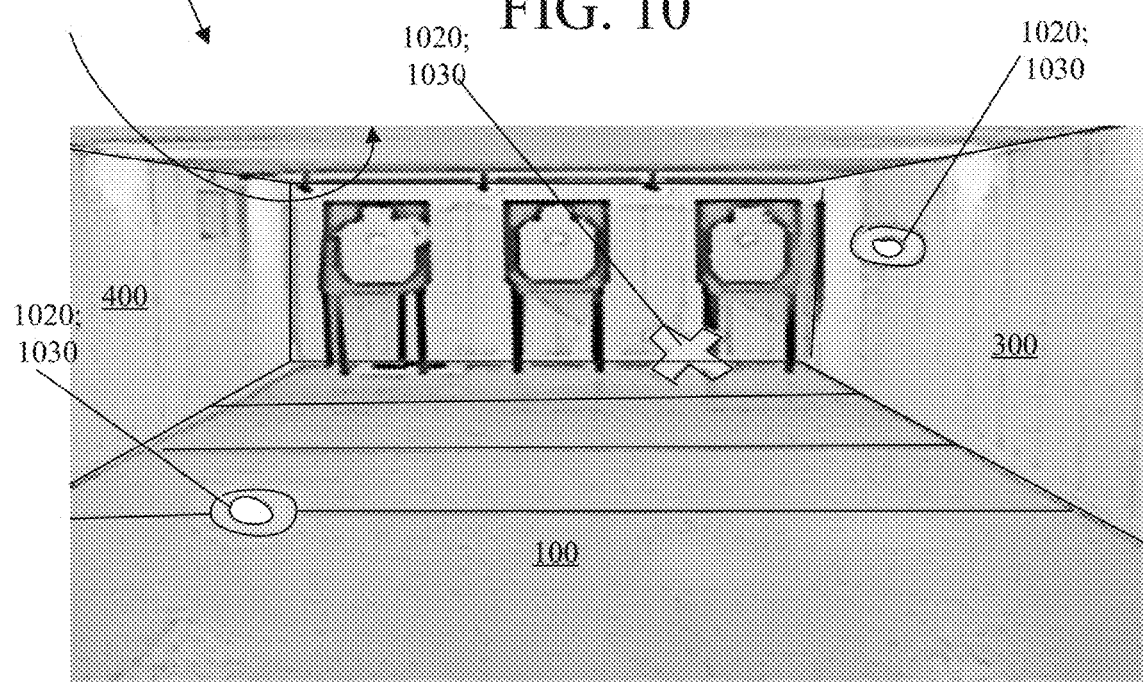
FIG. 11 illustrates a volumetric display system (Embodiment 6) according to example embodiments of the present disclosure, the system including a hologram light object high speed and accuracy firearms and combat training platform for practice and/or entertainment within a home, enterprise, artistic, and municipal environment.

With reference to FIG. 11, illustrates is a volumetric display system (Embodiment 6) 60 according to example embodiments of the present disclosure, the system including a hologram light object high speed and accuracy firearms and combat training platform for practice and/or entertainment within a home, enterprise, artistic, and municipal environment.

As shown, this VAST system includes a floor base unit 100 integrated into the floor surface, a top ceiling unit 200 integrated into the ceiling, a side wall laser projection unit 300 integrated into the right side wall and a side wall laser termination unit 400 integrated into the left side wall which operate as previously described, to provide an invisible display volume with holographic content/floating target content 1020;1030 for a user/shooter 8.

Figure 12:
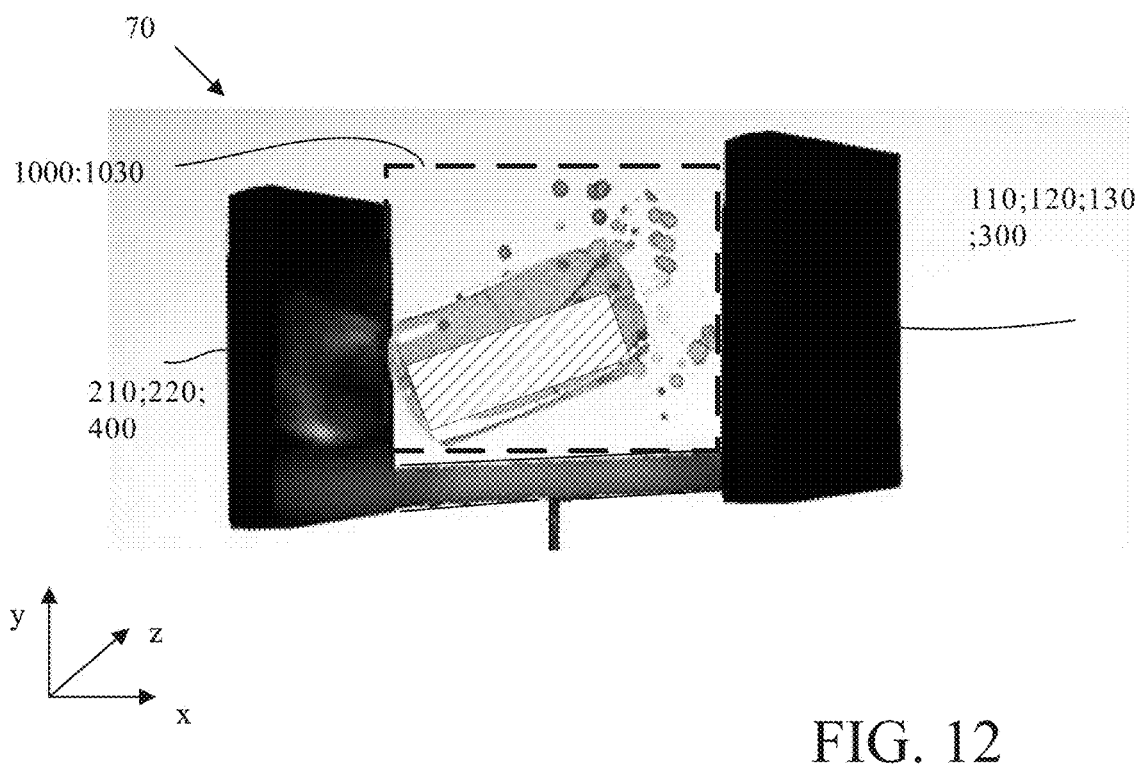
FIG. 12 illustrates a volumetric display system (Embodiment 7) according to example embodiments of the present disclosure, the system including hologram light object public advertisements and installations for a home, enterprise, artistic, and municipal environment.

With reference to FIG. 12, illustrated is a volumetric display system (Embodiment 7) 70 according to example embodiments of the present disclosure, the system including hologram light object public advertisements and installations for a home, enterprise, artistic, and municipal environment.

As shown, this VAST system includes a right unit 110; 120;120;130;300 which integrates the functionality of the particulate flow generator 110, columnar flow generator 120, laminar flow grid 130 and laser projector array 300 as previously described, to provide an invisible display volume with holographic content/floating content 1000;1030. for a user 8. The VAST system further includes a left unit 210; 220;400 which integrates the functionality of the laminar ducting grid array 210, suction/vacuum system 220 and laser termination 400.

Figure 13:
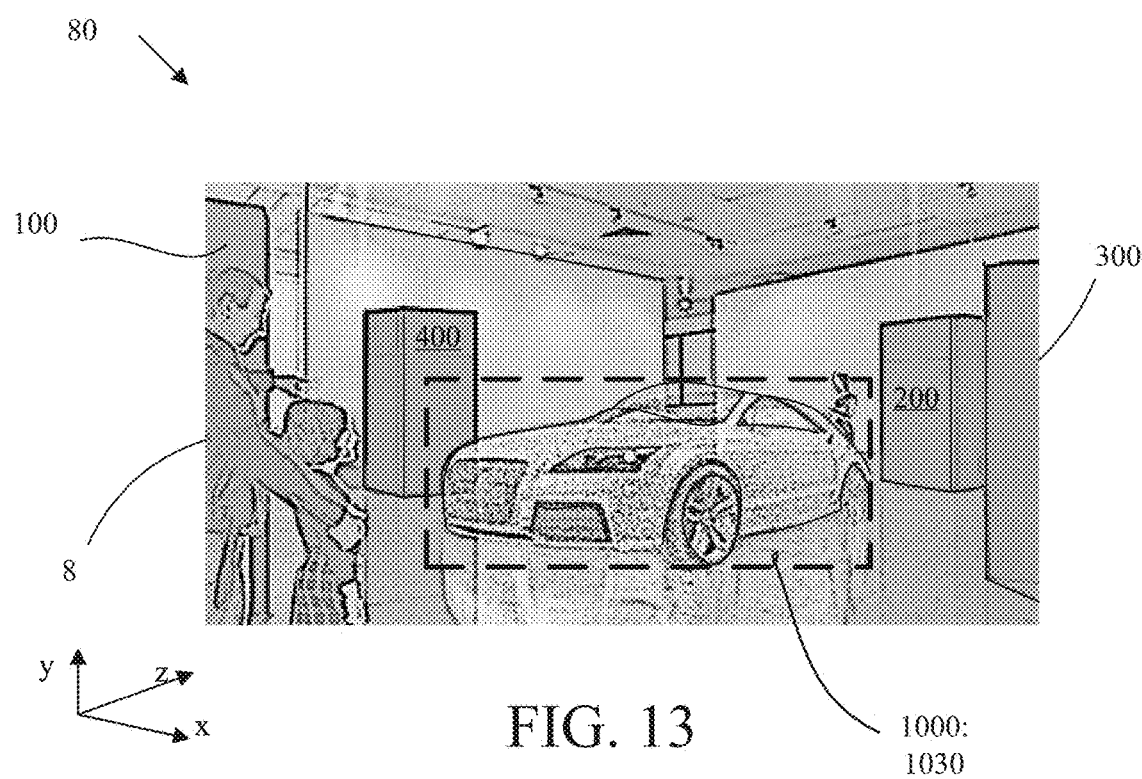
FIG. 13 illustrates a volumetric display system (Embodiment 8) according to example embodiments of the present disclosure, the system including a hologram light object system scaled for room meetings or as a showcase for home, enterprise, artistic, and municipal environments.

With reference to FIG. 13, illustrates is a volumetric display system (Embodiment 8) 80 according to example embodiments of the present disclosure, the system including a hologram light object system scaled for room meetings or as a showcase for home, enterprise, artistic, and municipal environments.

As shown, this VAST system includes a front base unit 100, a rear unit 200, a right side laser projector array unit 300 and a left side laser terminator unit 400 which function as previously described, to provide an invisible display volume with holographic content/floating content 1000; 1030 for a user 8.

Other applications include, but are not limited to, Hologram light object functional interactive barriers and signage: home, enterprise, artistic, municipal. Hologram light object stage show or presentation concept with unit elements hidden below, above, and off stage. Also showing that light object can be filmed broadcast either live-streamed or filmed for a later date for film, TV, commercials, and live broadcast (on back screen in image): home, enterprise, artistic, municipal.

In the following, some further embodiments are described.

[A1] In a nonlimiting illustrative embodiment, a method of generating a holographic image within an ambient atmosphere air display volume using a columnar laminar flow generation system and a laser projection system, the method comprising: the columnar laminar flow generation system intaking an input ambient atmosphere air and generating an ambient atmosphere air flow; the columnar laminar flow generation system combining the input ambient atmosphere air flow with at least one particulate flow using a first laminar flow grid to receive the input atmosphere air flow and generate a plurality of parallel columnar laminar atmosphere air flow streams and a plurality of parallel columnar laminar atmosphere particulate flow streams extending from the first laminar flow grid through the ambient atmosphere air display volume to a second laminar flow grid displaced from the first laminar flow grid, the first laminar flow grid including an array of parallel columnar flow guides, each flow guide including an inlet end receiving at least a portion of the ambient atmosphere air flow or at least a portion of the one or more particulate flows, an outlet end outputting at a first constant flow rate one or more of the plurality of columnar laminar atmosphere air flow streams or one or more of the parallel columnar laminar particulate flow streams, and a hollow center volume extending from the inlet end to the outlet end; the second laminar flow grid intaking at a second constant flow rate the combined atmosphere air flow and at least one particulate flow through the second laminar flow grid, the second laminar flow grid including an array of parallel columnar flow guides, each flow guide including an inlet end receiving at least a portion of the one or more of the plurality of columnar parallel laminar atmosphere air flow streams or at least a portion of the parallel columnar laminar particulate flow streams, an outlet end outputting at a second flow rate at least a portion of the plurality of columnar parallel laminar atmosphere air flow streams or at least a portion of the parallel columnar laminar particulate flow streams flows, and a hollow center volume extending from the inlet end to the outlet end; and the laser projection system outputting a plurality of laser beams representative of the holographic image, each of the plurality of laser beams aligned to overlap a section of a single columnar laminar particulate flow within the ambient atmosphere air display volume and each of the laser beams illuminating a target particulate flow within the respective overlapping section of the single columnar laminar particulate flow.

[A2] In another nonlimiting illustrative embodiment, the method of paragraph [A1], wherein the ambient atmosphere air flow includes ambient atmosphere air provided from a first air inlet and the particulate flow includes atmosphere air provided from a second air inlet distinct from the first air inlet.

[A3] In another nonlimiting illustrative embodiment, the method of paragraph [A1], wherein the laminar flow receiving unit is vertically displaced from the first laminar flow grid, the first laminar flow grid is vertically aligned with the second laminar flow grid, the first laminar flow grid and the second laminar flow grid include an equal number and size of parallel columnar flow guides.

[A4] In another nonlimiting illustrative embodiment, the method of paragraph [A1], wherein the first laminar flow grid array of parallel columnar flow guides includes laminar air flow guides and particulate flow guides, and the columnar laminar flow generation system generates the plurality of parallel columnar laminar atmosphere air flow streams using one or more ionic wind generators operatively connected to the laminar air flow guides.

[A5] In another nonlimiting illustrative embodiment, the method of paragraph [A1], wherein the first laminar flow grid array of parallel columnar flow guides includes laminar air flow guides and particulate flow guides, and the columnar laminar flow generation system generates the particulate flow by: using a particulate reservoir and operatively associated phase change device to change the phase of a reservoir particulate output flow to generate the particulate flow; and injecting the particulate flow into the particulate flow guides.

[A6] In another nonlimiting illustrative embodiment, the method of paragraph [A1], wherein the first laminar flow grid array of parallel columnar flow guides includes laminar air flow guides and particulate flow guides, the method further comprising: the columnar laminar flow generation system generating the plurality of parallel columnar laminar atmosphere air flow streams using one or more ionic wind generators operatively connected to the laminar air flow guides, and using a particulate reservoir and operatively associated phase change device, changing the phase of a reservoir particulate output flow to generate the particulate flow; and injecting the particulate flow into the particulate flow guides.

[A7] In another nonlimiting illustrative embodiment, the method of paragraph [A1], wherein the first laminar flow grid array of parallel columnar flow guides includes laminar air flow guides and particulate flow guides, each of the particulate flow guides is surrounded by laminar flow guides, and the inlet of each of the particulate flow guides is isolated from the surrounding flow guides.

[A8] In another nonlimiting illustrative embodiment, the method of paragraph [A1], wherein the plurality of laser beams output by the laser projection system are aligned to intersect the laminar particulate flows at an angle of 0 degrees to 90 degrees relative to a flow direction of the particulate flow.

[A9] In another nonlimiting illustrative embodiment, the method of paragraph [A1], wherein the plurality of parallel columnar laminar atmosphere air flow streams and plurality of parallel columnar laminar atmosphere particulate flow streams flow substantially vertically or diagonally relative to a gravitational force, and flow against the gravitational force.

[A10] In another nonlimiting illustrative embodiment, the method of paragraph [A1], further comprising terminating the plurality of laser beams after they pass through the ambient atmosphere air display volume.

[B1] In another nonlimiting illustrative embodiment, a holographic image generation system comprising: a columnar laminar flow generation system including: an ambient atmosphere air intake; a first laminar flow grid including an array of parallel columnar flow guides, each flow guide including an inlet end receiving at least a portion of an ambient atmosphere air flow or at least a portion of one or more particulate flows, an outlet end, and a hollow center volume extending from the inlet end to the outlet end; and a second laminar flow grid, and a laser projection system, wherein a) the ambient atmosphere air intake intakes an input ambient atmosphere air and generates an ambient atmosphere air flow; b) the first laminar flow grid combines the input ambient atmosphere air flow with at least one particulate flow to generate a plurality of parallel columnar laminar atmosphere air flow streams and a plurality of parallel columnar laminar atmosphere particulate flow streams extending from the first laminar flow grid through an ambient atmosphere air display volume to the second laminar flow grid displaced from the first laminar flow grid, and c) the laser projection system outputs a plurality of laser beams representative of a holographic image to be displayed, each of the plurality of laser beams aligned to overlap a section of a single columnar laminar particulate flow within the ambient atmosphere air display volume and each of the laser beams illuminating a target particulate flow within the respective overlapping section of the single columnar laminar particulate flow.

[B2] In another nonlimiting illustrative embodiment, the system of paragraph [B1], wherein the ambient atmosphere air flow includes ambient atmosphere air provided from a first air inlet and the particulate flow includes atmosphere air provided from a second air inlet distinct from the first air inlet.

[B3] In another nonlimiting illustrative embodiment, the system of paragraph [B1], wherein the laminar flow receiving unit is vertically displaced from the first laminar flow grid, the first laminar flow grid is vertically aligned with the second laminar flow grid, the first laminar flow grid and the second laminar flow grid include an equal number and size of parallel columnar flow guides.

[B4] In another nonlimiting illustrative embodiment, the system of paragraph [B1], wherein the first laminar flow grid array of parallel columnar flow guides includes laminar air flow guides and particulate flow guides, and the columnar laminar flow generation system generates the plurality of parallel columnar laminar atmosphere air flow streams using one or more ionic wind generators operatively connected to the laminar air flow guides.

[B5] In another nonlimiting illustrative embodiment, the system of paragraph [B1], wherein the first laminar flow grid array of parallel columnar flow guides includes laminar air flow guides and particulate flow guides, and the columnar laminar flow generation system generates the particulate flow by: using a particulate reservoir and operatively associated phase change device to change the phase of a reservoir particulate output flow to generate the particulate flow; and injecting the particulate flow into the particulate flow guides.

[B6] In another nonlimiting illustrative embodiment, the system of paragraph [B1], wherein the first laminar flow grid array of parallel columnar flow guides includes laminar air flow guides and particulate flow guides, the method further comprising: the columnar laminar flow generation system generating the plurality of parallel columnar laminar atmosphere air flow streams using one or more ionic wind generators operatively connected to the laminar air flow guides, and using a particulate reservoir and operatively associated phase change device, changing the phase of a reservoir particulate output flow to generate the particulate flow; and injecting the particulate flow into the particulate flow guides.

[B7] In another nonlimiting illustrative embodiment, the system of paragraph [B1], wherein the first laminar flow grid array of parallel columnar flow guides includes laminar air flow guides and particulate flow guides, each of the particulate flow guides is surrounded by laminar flow guides, and the inlet of each of the particulate flow guides is isolated from the surrounding flow guides.

[B8] In another nonlimiting illustrative embodiment, the system of paragraph [B1], wherein the plurality of laser beams output by the laser projection system are aligned to intersect the laminar particulate flows at an angle of 0 degrees to 90 degrees relative to a flow direction of the particulate flow.

[B9] In another nonlimiting illustrative embodiment, the system of paragraph [B1], wherein the plurality of parallel columnar laminar atmosphere air flow streams and plurality of parallel columnar laminar atmosphere particulate flow streams flow substantially vertically or diagonally relative to a gravitational force, and flow against the gravitational force.

[B10] In another nonlimiting illustrative embodiment, the system of paragraph [B1], further comprising a laser terminator terminating the plurality of laser beams after they pass through the ambient atmosphere air display volume.

[C1] In another nonlimiting illustrative embodiment, a method of generating a holographic image within an ambient atmosphere air display volume using a columnar laminar flow generation system and a laser projection system, the method comprising: the columnar laminar flow generation system intaking an input ambient atmosphere air and generating an ambient atmosphere air flow using one or more ionic wind generators; the columnar laminar flow generation system combining the input ambient atmosphere air flow with at least one particulate flow using a first laminar flow grid to receive the input atmosphere air flow and generate a plurality of parallel columnar laminar atmosphere air flow streams and a plurality of parallel columnar laminar atmosphere particulate flow streams extending from the first laminar flow grid through the ambient atmosphere air display volume to a second laminar flow grid displaced from the first laminar flow grid, the first laminar flow grid including an array of parallel columnar flow guides, each flow guide including an inlet end receiving at least a portion of the ambient atmosphere air flow or at least a portion of the one or more particulate flows, an outlet end outputting at a first constant flow rate one or more of the plurality of columnar laminar atmosphere air flow streams or one or more of the parallel columnar laminar particulate flow streams, and a hollow center volume extending from the inlet end to the outlet end; the second laminar flow grid intaking at a second constant flow rate the combined atmosphere air flow and at least one particulate flow through the second laminar flow grid, the second laminar flow grid including an array of parallel columnar flow guides, each flow guide including an inlet end receiving at least a portion of the one or more of the plurality of columnar parallel laminar atmosphere air flow streams or at least a portion of the parallel columnar laminar particulate flow streams, an outlet end outputting at a second flow rate at least a portion of the plurality of columnar parallel laminar atmosphere air flow streams or at least a portion of the parallel columnar laminar particulate flow streams flows, and a hollow center volume extending from the inlet end to the outlet end; and the laser projection system outputting a plurality of laser beams representative of the holographic image, each of the plurality of laser beams aligned to a) overlap with a section of a single columnar laminar particulate flow within the ambient atmosphere air display volume or b) longitudinally align with a single columnar laminar particulate flow within the ambient atmosphere air display volume, and each of the laser beams illuminating a target particulate flow within the respective overlapping section or the longitudinally aligned single columnar laminar particulate flow.

[C2] In another nonlimiting illustrative embodiment, the method of paragraph [C1], wherein the ambient atmosphere air flow includes ambient atmosphere air provided from a first air inlet and the particulate flow includes atmosphere air provided from a second air inlet distinct from the first air inlet, and wherein the first laminar flow grid array of parallel columnar flow guides includes laminar air flow guides and particulate flow guides, and the columnar laminar flow generation system generates the plurality of parallel columnar laminar atmosphere air flow streams using one or more ionic wind generators operatively connected to the laminar air flow guides.

[C3] In another nonlimiting illustrative embodiment, the method of paragraph [C1], wherein the first laminar flow grid array of parallel columnar flow guides includes laminar air flow guides and particulate flow guides, and the columnar laminar flow generation system generates the particulate flow by: using a particulate reservoir and operatively associated phase change device to change the phase of a reservoir particulate output flow to generate the particulate flow; and injecting the particulate flow into the particulate flow guides.

[C4] In another nonlimiting illustrative embodiment, the method of paragraph [C1], wherein the first laminar flow grid array of parallel columnar flow guides includes laminar air flow guides and particulate flow guides, each of the particulate flow guides is surrounded by laminar flow guides, and the inlet of each of the particulate flow guides is isolated from the surrounding flow guides.

[C5] In another nonlimiting illustrative embodiment, the method of paragraph [C1], further comprising terminating the plurality of laser beams after they pass through the ambient atmosphere air display volume.

[D1] In another nonlimiting illustrative embodiment, a holographic image generation system comprising: a columnar laminar flow generation system including: an ambient atmosphere air intake; a first laminar flow grid including an array of parallel columnar flow guides, each flow guide including an inlet end receiving at least a portion of an ambient atmosphere air flow or at least a portion of one or more particulate flows, an outlet end, and a hollow center volume extending from the inlet end to the outlet end; and a second laminar flow grid, and a laser projection system, wherein the laser projection system outputs a plurality of laser beams representative of the holographic image, each of the plurality of laser beams aligned to a) overlap with a section of a single columnar laminar particulate flow within the ambient atmosphere air display volume or b) longitudinally align with a single columnar laminar particulate flow within the ambient atmosphere air display volume, and each of the laser beams illuminating a target particulate flow within the respective overlapping section or the longitudinally aligned single columnar laminar particulate flow.

[D2] In another nonlimiting illustrative embodiment, the system of paragraph [D1], wherein the ambient atmosphere air flow includes ambient atmosphere air provided from a first air inlet and the particulate flow includes atmosphere air provided from a second air inlet distinct from the first air inlet, and wherein the first laminar flow grid array of parallel columnar flow guides includes laminar air flow guides and particulate flow guides, and the columnar laminar flow generation system generates the plurality of parallel columnar laminar atmosphere air flow streams using one or more ionic wind generators operatively connected to the laminar air flow guides.

[D3] In another nonlimiting illustrative embodiment, the system of paragraph [D1], wherein the first laminar flow grid array of parallel columnar flow guides includes laminar air flow guides and particulate flow guides, and the columnar laminar flow generation system generates the particulate flow by: using a particulate reservoir and operatively associated phase change device to change the phase of a reservoir particulate output flow to generate the particulate flow; and injecting the particulate flow into the particulate flow guides.

[D4] In another nonlimiting illustrative embodiment, the system of paragraph [D1], wherein the first laminar flow grid array of parallel columnar flow guides includes laminar air flow guides and particulate flow guides, each of the particulate flow guides is surrounded by laminar flow guides, and the inlet of each of the particulate flow guides is isolated from the surrounding flow guides.

[D5] In another nonlimiting illustrative embodiment, the system of paragraph [D1], further comprising a laser terminator terminating the plurality of laser beams after they pass through the ambient atmosphere air display volume.

[E1] In another nonlimiting illustrative embodiment, a method of generating a holographic image within an ambient atmosphere air display volume using a columnar laminar flow generation system and a laser projection system, the method comprising: a bottom unit intaking an input ambient atmosphere air and generating an ambient atmosphere air flow and combining the input ambient atmosphere air flow with at least one particulate flow using a first laminar flow grid to receive the input atmosphere air flow and generate a plurality of parallel columnar laminar atmosphere air flow streams and a plurality of parallel columnar laminar atmosphere particulate flow streams extending from the first laminar flow grid through the ambient atmosphere air display volume, the first laminar flow grid including an array of parallel columnar flow guides, each flow guide including an inlet end receiving at least a portion of the ambient atmosphere air flow or at least a portion of the one or more particulate flows, an outlet end outputting at a first constant flow rate one or more of the plurality of columnar laminar atmosphere air flow streams or one or more of the parallel columnar laminar particulate flow streams, and a hollow center volume extending from the inlet end to the outlet end; a top unit, vertically displaced from the bottom unit, intaking through a second laminar flow grid the plurality of parallel columnar laminar atmosphere air flow streams and the plurality of parallel columnar laminar atmosphere particulate flow streams from the base unit, the second laminar flow grid including an array of parallel columnar flow guides, each flow guide including an inlet end receiving at least a portion of the one or more of the plurality of columnar parallel laminar atmosphere air flow streams or at least a portion of the parallel columnar laminar particulate flow streams, an outlet end outputting at a second flow rate at least a portion of the plurality of columnar parallel laminar atmosphere air flow streams or at least a portion of the parallel columnar laminar particulate flow streams flows, and a hollow center volume extending from the inlet end to the outlet end; and the laser projection system outputting a plurality of laser beams representative of the holographic image, each of the plurality of laser beams aligned to overlap a section of a single columnar laminar particulate flow within the ambient atmosphere air display volume and each of the laser beams illuminating a target particulate flow within the respective overlapping section of the single columnar laminar particulate flow.

[E2] In another nonlimiting illustrative embodiment, the method of paragraph [E1], wherein the ambient atmosphere air flow includes ambient atmosphere air provided from a first air inlet and the particulate flow includes atmosphere air provided from a second air inlet distinct from the first air inlet, and wherein the first laminar flow grid array of parallel columnar flow guides includes laminar air flow guides and particulate flow guides, and the columnar laminar flow generation system generates the plurality of parallel columnar laminar atmosphere air flow streams using one or more ionic wind generators operatively connected to the laminar air flow guides.

[E3] In another nonlimiting illustrative embodiment, the method of paragraph [E1], wherein the first laminar flow grid array of parallel columnar flow guides includes laminar air flow guides and particulate flow guides, and the columnar laminar flow generation system generates the particulate flow by: using a particulate reservoir and operatively associated phase change device to change the phase of a reservoir particulate output flow to generate the particulate flow; and injecting the particulate flow into the particulate flow guides.

[E4] In another nonlimiting illustrative embodiment, the method of paragraph [E1], wherein the first laminar flow grid array of parallel columnar flow guides includes laminar air flow guides and particulate flow guides, each of the particulate flow guides is surrounded by laminar flow guides, and the inlet of each of the particulate flow guides is isolated from the surrounding flow guides.

[E5] In another nonlimiting illustrative embodiment, the method of paragraph [E1], further comprising terminating the plurality of laser beams after they pass through the ambient atmosphere air display volume.

[F1] In another nonlimiting illustrative embodiment, a holographic image generation system comprising: a columnar laminar flow generation system including: a base unit including an ambient atmosphere air intake, and a first laminar flow grid including an array of parallel columnar flow guides, each flow guide including an inlet end receiving at least a portion of an ambient atmosphere air flow or at least a portion of one or more particulate flows, an outlet end, and a hollow center volume extending from the inlet end to the outlet end; a top unit including a second laminar flow grid, and a laser projection system, wherein a) the ambient atmosphere air intake intakes an input ambient atmosphere air and generates an ambient atmosphere air flow; b) the first laminar flow grid combines the input ambient atmosphere air flow with at least one particulate flow to generate a plurality of parallel columnar laminar atmosphere air flow streams and a plurality of parallel columnar laminar atmosphere particulate flow streams extending from the first laminar flow grid through an ambient atmosphere air display volume to the second laminar flow grid displaced from the first laminar flow grid, and c) the laser projection system outputs a plurality of laser beams representative of a holographic image to be displayed, each of the plurality of laser beams aligned to overlap a section of a single columnar laminar particulate flow within the ambient atmosphere air display volume and each of the laser beams illuminating a target particulate flow within the respective overlapping section of the single columnar laminar particulate flow.

[F2] In another nonlimiting illustrative embodiment, the system of paragraph [F1], wherein the ambient atmosphere air flow includes ambient atmosphere air provided from a first air inlet and the particulate flow includes atmosphere air provided from a second air inlet distinct from the first air inlet, and wherein the first laminar flow grid array of parallel columnar flow guides includes laminar air flow guides and particulate flow guides, and the columnar laminar flow generation system generates the plurality of parallel columnar laminar atmosphere air flow streams using one or more ionic wind generators operatively connected to the laminar air flow guides.

[F3] In another nonlimiting illustrative embodiment, the system of paragraph [F1], wherein the first laminar flow grid array of parallel columnar flow guides includes laminar air flow guides and particulate flow guides, and the columnar laminar flow generation system generates the particulate flow by: using a particulate reservoir and operatively associated phase change device to change the phase of a reservoir particulate output flow to generate the particulate flow; and injecting the particulate flow into the particulate flow guides.

[F4] In another nonlimiting illustrative embodiment, the system of paragraph [F1], wherein the first laminar flow grid array of parallel columnar flow guides includes laminar air flow guides and particulate flow guides, each of the particulate flow guides is surrounded by laminar flow guides, and the inlet of each of the particulate flow guides is isolated from the surrounding flow guides.

[F5] In another nonlimiting illustrative embodiment, the system of paragraph [F1], further comprising a laser terminator terminating the plurality of laser beams after they pass through the ambient atmosphere air display volume.

[G1] In another nonlimiting illustrative embodiment, a holographic image generation system comprising: a base unit including: a columnar laminar flow generation system including an ambient atmosphere air intake, and a first laminar flow grid including an array of parallel columnar flow guides, each flow guide including an inlet end receiving at least a portion of an ambient atmosphere air flow or at least a portion of one or more particulate flows, an outlet end, and a hollow center volume extending from the inlet end to the outlet end; and a laser projection system; and a top unit including a second laminar flow grid, wherein a) the ambient atmosphere air intake intakes an input ambient atmosphere air and generates an ambient atmosphere air flow; b) the first laminar flow grid combines the input ambient atmosphere air flow with at least one particulate flow to generate a plurality of parallel columnar laminar atmosphere air flow streams and a plurality of parallel columnar laminar atmosphere particulate flow streams extending from the first laminar flow grid through an ambient atmosphere air display volume to the second laminar flow grid displaced from the first laminar flow grid, and c) the laser projection system outputs a plurality of laser beams representative of a holographic image to be displayed, each of the plurality of laser beams aligned to overlap a section of a single columnar laminar particulate flow within the ambient atmosphere air display volume and each of the laser beams illuminating a target particulate flow within the respective overlapping section of the single columnar laminar particulate flow, and wherein the bottom unit and top unit are vertically aligned with the ambient atmosphere air display volume.

[G2] In another nonlimiting illustrative embodiment, the system of paragraph [G1], wherein the ambient atmosphere air flow includes ambient atmosphere air provided from a first air inlet and the particulate flow includes atmosphere air provided from a second air inlet distinct from the first air inlet, and wherein the first laminar flow grid array of parallel columnar flow guides includes laminar air flow guides and particulate flow guides, and the columnar laminar flow generation system generates the plurality of parallel columnar laminar atmosphere air flow streams using one or more ionic wind generators operatively connected to the laminar air flow guides.

[G3] In another nonlimiting illustrative embodiment, the system of paragraph [G1], wherein the first laminar flow grid array of parallel columnar flow guides includes laminar air flow guides and particulate flow guides, and the columnar laminar flow generation system generates the particulate flow by: using a particulate reservoir and operatively associated phase change device to change the phase of a reservoir particulate output flow to generate the particulate flow; and injecting the particulate flow into the particulate flow guides.

[G4] In another nonlimiting illustrative embodiment, the system of paragraph [G1], wherein the first laminar flow grid array of parallel columnar flow guides includes laminar air flow guides and particulate flow guides, each of the particulate flow guides is surrounded by laminar flow guides, and the inlet of each of the particulate flow guides is isolated from the surrounding flow guides.

[G5] In another nonlimiting illustrative embodiment, the system of paragraph [G1], further comprising a laser terminator terminating the plurality of laser beams after they pass through the ambient atmosphere air display volume.

[H1] In another nonlimiting illustrative embodiment, a holographic image generation system comprising: a base unit including; a columnar laminar flow generation system including an ambient atmosphere air intake, and a first laminar flow grid including an array of parallel columnar flow guides, each flow guide including an inlet end receiving at least a portion of an ambient atmosphere air flow or at least a portion of one or more particulate flows, an outlet end, and a hollow center volume extending from the inlet end to the outlet end; and a laser projection system; and a top unit including a second laminar flow grid, wherein a) the ambient atmosphere air intake intakes an input ambient atmosphere air and generates an ambient atmosphere air flow; b) the first laminar flow grid combines the input ambient atmosphere air flow with at least one particulate flow to generate a plurality of parallel columnar laminar atmosphere air flow streams and a plurality of parallel columnar laminar atmosphere particulate flow streams extending from the first laminar flow grid through an ambient atmosphere air display volume to the second laminar flow grid displaced from the first laminar flow grid, and c) the laser projection system outputs a plurality of laser beams representative of a holographic image to be displayed, each of the plurality of laser beams aligned to overlap a section of a single columnar laminar particulate flow within the ambient atmosphere air display volume and each of the laser beams illuminating a target particulate flow within the respective overlapping section of the single columnar laminar particulate flow, and wherein the base unit and top are diagonally aligned, the base unit located near a lower corner of the atmosphere air display volume and the top unit located near an upper opposite diagonal corner of the atmosphere air display volume.

[H2] In another nonlimiting illustrative embodiment, the system of paragraph [H1], wherein the ambient atmosphere air flow includes ambient atmosphere air provided from a first air inlet and the particulate flow includes atmosphere air provided from a second air inlet distinct from the first air inlet, and wherein the first laminar flow grid array of parallel columnar flow guides includes laminar air flow guides and particulate flow guides, and the columnar laminar flow generation system generates the plurality of parallel columnar laminar atmosphere air flow streams using one or more ionic wind generators operatively connected to the laminar air flow guides.

[H3] In another nonlimiting illustrative embodiment, the system of paragraph [H1], wherein the first laminar flow grid array of parallel columnar flow guides includes laminar air flow guides and particulate flow guides, and the columnar laminar flow generation system generates the particulate flow by: using a particulate reservoir and operatively associated phase change device to change the phase of a reservoir particulate output flow to generate the particulate flow; and injecting the particulate flow into the particulate flow guides.

[H4] In another nonlimiting illustrative embodiment, the system of paragraph [H1], wherein the first laminar flow grid array of parallel columnar flow guides includes laminar air flow guides and particulate flow guides, each of the particulate flow guides is surrounded by laminar flow guides, and the inlet of each of the particulate flow guides is isolated from the surrounding flow guides.

[H5] In another nonlimiting illustrative embodiment, the system of paragraph [H1], further comprising a laser terminator terminating the plurality of laser beams after they pass through the ambient atmosphere air display volume.

[I1] In another nonlimiting illustrative embodiment, a holographic image generation system comprising: a vertically extended first side unit including: a columnar laminar flow generation system including an ambient atmosphere air intake, and a first laminar flow grid including an array of parallel columnar flow guides, each flow guide including an inlet end receiving at least a portion of an ambient atmosphere air flow or at least a portion of one or more particulate flows, an outlet end, and a hollow center volume extending from the inlet end to the outlet end; and a laser projection system; and a vertically extended second side unit including a second laminar flow grid, wherein a) the ambient atmosphere air intake intakes an input ambient atmosphere air and generates an ambient atmosphere air flow; b) the first laminar flow grid combines the input ambient atmosphere air flow with at least one particulate flow to generate a plurality of parallel columnar laminar atmosphere air flow streams and a plurality of parallel columnar laminar atmosphere particulate flow streams extending from the first laminar flow grid through an ambient atmosphere air display volume to the second laminar flow grid displaced from the first laminar flow grid, and c) the laser projection system outputs a plurality of laser beams representative of a holographic image to be displayed, each of the plurality of laser beams aligned to a) overlap with a section of a single columnar laminar particulate flow within the ambient atmosphere air display volume or b) longitudinally align with a single columnar laminar particulate flow within the ambient atmosphere air display volume and each of the laser beams illuminating a target particulate flow within the respective overlapping section of the single columnar laminar particulate flow, and wherein the first side unit and second side unit are horizontally aligned with the ambient atmosphere air display volume.

[I2] In another nonlimiting illustrative embodiment, the system of paragraph [I1], wherein the ambient atmosphere air flow includes ambient atmosphere air provided from a first air inlet and the particulate flow includes atmosphere air provided from a second air inlet distinct from the first air inlet, and wherein the first laminar flow grid array of parallel columnar flow guides includes laminar air flow guides and particulate flow guides, and the columnar laminar flow generation system generates the plurality of parallel columnar laminar atmosphere air flow streams using one or more ionic wind generators operatively connected to the laminar air flow guides.

[I3] In another nonlimiting illustrative embodiment, the system of paragraph [I1], wherein the first laminar flow grid array of parallel columnar flow guides includes laminar air flow guides and particulate flow guides, and the columnar laminar flow generation system generates the particulate flow by: using a particulate reservoir and operatively associated phase change device to change the phase of a reservoir particulate output flow to generate the particulate flow; and injecting the particulate flow into the particulate flow guides.

[I4] In another nonlimiting illustrative embodiment, the system of paragraph [I1], wherein the first laminar flow grid array of parallel columnar flow guides includes laminar air flow guides and particulate flow guides, each of the particulate flow guides is surrounded by laminar flow guides, and the inlet of each of the particulate flow guides is isolated from the surrounding flow guides.

[I5] In another nonlimiting illustrative embodiment, the system of paragraph [I1], further comprising a laser terminator terminating the plurality of laser beams after they pass through the ambient atmosphere air display volume.

[J1] In another nonlimiting illustrative embodiment, a method of generating a holographic image within an ambient atmosphere air display volume using a columnar laminar flow generation system and a laser projection system, the method comprising: the columnar laminar flow generation system intaking an input ambient atmosphere air and generating an ambient atmosphere air flow; the columnar laminar flow generation system combining the input ambient atmosphere air flow with at least one particulate flow to generate a plurality of parallel columnar laminar atmosphere air flow streams and a plurality of parallel columnar laminar atmosphere particulate flow streams extending through the ambient atmosphere air display volume; the columnar laminar flow generation system intaking the combined atmosphere air flow and at least one particulate flow after the plurality of parallel columnar laminar atmosphere air flow streams and the plurality of parallel columnar laminar atmosphere particulate flow streams pass through the ambient atmosphere air display volume; and the laser projection system outputting a plurality of laser beams representative of the holographic image, each of the plurality of laser beams aligned to overlap a section of a single columnar laminar particulate flow within the ambient atmosphere air display volume and each of the laser beams illuminating a target particulate flow within the respective overlapping section of the single columnar laminar particulate flow.

[K1] In another nonlimiting illustrative embodiment, a holographic image generation system comprising: a columnar laminar flow generation system including: an ambient atmosphere air intake; a first array of parallel columnar flow guides, each flow guide including an inlet end receiving at least a portion of an ambient atmosphere air flow or at least a portion of one or more particulate flows, an outlet end, and a hollow center volume extending from the inlet end to the outlet end; and a second array of parallel columnar flow guides, each flow guide including an inlet end receiving at least a portion of an ambient atmosphere air flow or at least a portion of one or more particulate flows, an outlet end, and a hollow center volume extending from the inlet end to the outlet end; and a laser projection system, wherein a) the ambient atmosphere air intake intakes an input ambient atmosphere air and generates an ambient atmosphere air flow; b) the first array of parallel columnar flow guides combines the input ambient atmosphere air flow with at least one particulate flow to generate a plurality of parallel columnar laminar atmosphere air flow streams and a plurality of parallel columnar laminar atmosphere particulate flow streams extending from the first parallel columnar flow guides through an ambient atmosphere air display volume to the second parallel columnar flow guides displaced from the first parallel columnar flow guides, and c) the laser projection system outputs a plurality of laser beams representative of a holographic image to be displayed, each of the plurality of laser beams aligned to overlap a section of a single columnar laminar particulate flow within the ambient atmosphere air display volume and each of the laser beams illuminating a target particulate flow within the respective overlapping section of the single columnar laminar particulate flow.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of generating a holographic image within an ambient atmosphere air display volume using a columnar laminar flow generation system and a laser projection system, the method comprising:

the columnar laminar flow generation system intaking an input ambient atmosphere air and generating an ambient atmosphere air flow;

the columnar laminar flow generation system combining the input ambient atmosphere air flow with at least one particulate flow using a first laminar flow grid to receive the input atmosphere air flow and generate a plurality of parallel columnar laminar atmosphere air flow streams and a plurality of parallel columnar laminar atmosphere particulate flow streams extending from the first laminar flow grid through the ambient atmosphere air display volume to a second laminar flow grid displaced from the first laminar flow grid, the first laminar flow grid including an array of parallel columnar flow guides, each flow guide including an inlet end receiving at least a portion of the ambient atmosphere air flow or at least a portion of the one or more particulate flows, an outlet end outputting at a first constant flow rate one or more of the plurality of columnar laminar atmosphere air flow streams or one or more of the parallel columnar laminar particulate flow streams, and a hollow center volume extending from the inlet end to the outlet end;

the second laminar flow grid intaking at a second constant flow rate the combined atmosphere air flow and at least one particulate flow through the second laminar flow grid, the second laminar flow grid including an array of parallel columnar flow guides, each flow guide including an inlet end receiving at least a portion of the one or more of the plurality of columnar parallel laminar atmosphere air flow streams or at least a portion of the parallel columnar laminar particulate flow streams, an outlet end outputting at a second flow rate at least a portion of the plurality of columnar parallel laminar atmosphere air flow streams or at least a portion of the parallel columnar laminar particulate flow streams flows, and a hollow center volume extending from the inlet end to the outlet end; and the laser projection system outputting a plurality of laser beams representative of the holographic image, each of the plurality of laser beams aligned to overlap a section of a single columnar laminar particulate flow within the ambient atmosphere air display volume and each of the laser beams illuminating a target particulate flow within the respective overlapping section of the single columnar laminar particulate flow.

2. The method of claim 1, wherein the ambient atmosphere air flow includes ambient atmosphere air provided from a first air inlet and the particulate flow includes atmosphere air provided from a second air inlet distinct from the first air inlet.

3. The method of claim 1, wherein the laminar flow receiving unit is vertically displaced from the first laminar flow grid, the first laminar flow grid is vertically aligned with the second laminar flow grid, the first laminar flow grid and the second laminar flow grid include an equal number and size of parallel columnar flow guides.

4. The method of claim 1, wherein the first laminar flow grid array of parallel columnar flow guides includes laminar air flow guides and particulate flow guides, and the columnar laminar flow generation system generates the plurality of parallel columnar laminar atmosphere air flow streams using one or more ionic wind generators operatively connected to the laminar air flow guides.

5. The method of claim 1, wherein the first laminar flow grid array of parallel columnar flow guides includes laminar air flow guides and particulate flow guides, and the columnar laminar flow generation system generates the particulate flow by:

using a particulate reservoir and operatively associated phase change device to change the phase of a reservoir particulate output flow to generate the particulate flow; and injecting the particulate flow into the particulate flow guides.

6. The method of claim 1, wherein the first laminar flow grid array of parallel columnar flow guides includes laminar air flow guides and particulate flow guides, the method further comprising:

the columnar laminar flow generation system generating the plurality of parallel columnar laminar atmosphere air flow streams using one or more ionic wind generators operatively connected to the laminar air flow guides, and using a particulate reservoir and operatively associated phase change device, changing the phase of a reservoir particulate output flow to generate the particulate flow; and injecting the particulate flow into the particulate flow guides.

7. The method of claim 1, wherein the first laminar flow grid array of parallel columnar flow guides includes laminar air flow guides and particulate flow guides, each of the particulate flow guides is surrounded by laminar flow guides, and the inlet of each of the particulate flow guides is isolated from the surrounding flow guides.

8. The method of claim 1, wherein the plurality of laser beams output by the laser projection system are aligned to intersect the laminar particulate flows at an angle of 0 degrees to 90 degrees relative to a flow direction of the particulate flow.

9. The method of claim 1, wherein the plurality of parallel columnar laminar atmosphere air flow streams and plurality of parallel columnar laminar atmosphere particulate flow streams flow substantially vertically or diagonally relative to a gravitational force, and flow against the gravitational force.

10. The method of claim 1, further comprising:
terminating the plurality of laser beams after they pass through the ambient atmosphere air display volume.

11. A holographic image generation system comprising:
a columnar laminar flow generation system including:
an ambient atmosphere air intake;
a first laminar flow grid including an array of parallel columnar flow guides, each flow guide including an inlet end receiving at least a portion of an ambient atmosphere air flow or at least a portion of one or more particulate flows, an outlet end, and a hollow center volume extending from the inlet end to the outlet end; and
a second laminar flow grid, and
a laser projection system,
wherein a) the ambient atmosphere air intake intakes an input ambient atmosphere air and generates an ambient atmosphere air flow; b) the first laminar flow grid combines the input ambient atmosphere air flow with at least one particulate flow to generate a plurality of parallel columnar laminar atmosphere air flow streams and a plurality of parallel columnar laminar atmosphere particulate flow streams extending from the first laminar flow grid through an ambient atmosphere air display volume to the second laminar flow grid displaced from the first laminar flow grid, and c) the laser projection system outputs a plurality of laser beams representative of a holographic image to be displayed, each of the plurality of laser beams aligned to overlap a section of a single columnar laminar particulate flow within the ambient atmosphere air display volume and each of the laser beams illuminating a target particulate flow within the respective overlapping section of the single columnar laminar particulate flow.

12. The system of claim 11, wherein the ambient atmosphere air flow includes ambient atmosphere air provided from a first air inlet and the particulate flow includes atmosphere air provided from a second air inlet distinct from the first air inlet.

13. The system of claim 11, wherein the laminar flow receiving unit is vertically displaced from the first laminar flow grid, the first laminar flow grid is vertically aligned with the second laminar flow grid, the first laminar flow grid and the second laminar flow grid include an equal number and size of parallel columnar flow guides.

14. The system of claim 11, wherein the first laminar flow grid array of parallel columnar flow guides includes laminar air flow guides and particulate flow guides, and the columnar laminar flow generation system generates the plurality of parallel columnar laminar atmosphere air flow streams using one or more ionic wind generators operatively connected to the laminar air flow guides.

15. The system of claim 11, wherein the first laminar flow grid array of parallel columnar flow guides includes laminar air flow guides and particulate flow guides, and the columnar laminar flow generation system generates the particulate flow by:

using a particulate reservoir and operatively associated phase change device to change the phase of a reservoir particulate output flow to generate the particulate flow; and
injecting the particulate flow into the particulate flow guides.

16. The system of claim 11, wherein the first laminar flow grid array of parallel columnar flow guides includes laminar air flow guides and particulate flow guides, the method further comprising:
the columnar laminar flow generation system generating the plurality of parallel columnar laminar atmosphere air flow streams using one or more ionic wind generators operatively connected to the laminar air flow guides, and
using a particulate reservoir and operatively associated phase change device, changing the phase of a reservoir particulate output flow to generate the particulate flow; and
injecting the particulate flow into the particulate flow guides.

17. The system of claim 11, wherein the first laminar flow grid array of parallel columnar flow guides includes laminar air flow guides and particulate flow guides, each of the particulate flow guides is surrounded by laminar flow guides, and the inlet of each of the particulate flow guides is isolated from the surrounding flow guides.

18. The system of claim 11, wherein the plurality of laser beams output by the laser projection system are aligned to intersect the laminar particulate flows at an angle of 0 degrees to 90 degrees relative to a flow direction of the particulate flow.

19. The system of claim 11, wherein the plurality of parallel columnar laminar atmosphere air flow streams and plurality of parallel columnar laminar atmosphere particulate flow streams flow substantially vertically or diagonally relative to a gravitational force, and flow against the gravitational force.

20. The system of claim 11, further comprising:
a laser terminator terminating the plurality of laser beams after they pass through the ambient atmosphere air display volume.

21. A method of generating a holographic image within an ambient atmosphere air display volume using a columnar laminar flow generation system and a laser projection system, the method comprising:
the columnar laminar flow generation system intaking an input ambient atmosphere air and generating an ambient atmosphere air flow using one or more ionic wind generators;
the columnar laminar flow generation system combining the input ambient atmosphere air flow with at least one particulate flow using a first laminar flow grid to receive the input atmosphere air flow and generate a plurality of parallel columnar laminar atmosphere air flow streams and a plurality of parallel columnar laminar atmosphere particulate flow streams extending from the first laminar flow grid through the ambient atmosphere air display volume to a second laminar flow grid displaced from the first laminar flow grid, the first laminar flow grid including an array of parallel columnar flow guides, each flow guide including an inlet end receiving at least a portion of the ambient atmosphere air flow or at least a portion of the one or more particulate flows, an outlet end outputting at a first constant flow rate one or more of the plurality of columnar laminar atmosphere air flow streams or one or more of the parallel columnar laminar particulate flow streams, and a hollow center volume extending from the inlet end to the outlet end;

the second laminar flow grid intaking at a second constant flow rate the combined atmosphere air flow and at least one particulate flow through the second laminar flow grid, the second laminar flow grid including an array of parallel columnar flow guides, each flow guide including an inlet end receiving at least a portion of the one or more of the plurality of columnar parallel laminar atmosphere air flow streams or at least a portion of the parallel columnar laminar particulate flow streams, an outlet end outputting at a second flow rate at least a portion of the plurality of columnar parallel laminar atmosphere air flow streams or at least a portion of the parallel columnar laminar particulate flow streams flows, and a hollow center volume extending from the inlet end to the outlet end; and the laser projection system outputting a plurality of laser beams representative of the holographic image, each of the plurality of laser beams aligned to a) overlap with a section of a single columnar laminar particulate flow within the ambient atmosphere air display volume or b) longitudinally align with a single columnar laminar particulate flow within the ambient atmosphere air display volume, and each of the laser beams illuminating a target particulate flow within the respective overlapping section or the longitudinally aligned single columnar laminar particulate flow.

22. The method of claim 21, wherein the ambient atmosphere air flow includes ambient atmosphere air provided from a first air inlet and the particulate flow includes atmosphere air provided from a second air inlet distinct from the first air inlet, and wherein the first laminar flow grid array of parallel columnar flow guides includes laminar air flow guides and particulate flow guides, and the columnar laminar flow generation system generates the plurality of parallel columnar laminar atmosphere air flow streams using one or more ionic wind generators operatively connected to the laminar air flow guides.

23. The method of claim 21, wherein the first laminar flow grid array of parallel columnar flow guides includes laminar air flow guides and particulate flow guides, and the columnar laminar flow generation system generates the particulate flow by:

using a particulate reservoir and operatively associated phase change device to change the phase of a reservoir particulate output flow to generate the particulate flow; and injecting the particulate flow into the particulate flow guides.

24. The method of claim 21, wherein the first laminar flow grid array of parallel columnar flow guides includes laminar air flow guides and particulate flow guides, each of the particulate flow guides is surrounded by laminar flow guides, and the inlet of each of the particulate flow guides is isolated from the surrounding flow guides.

25. The method of claim 21, further comprising:

terminating the plurality of laser beams after they pass through the ambient atmosphere air display volume.

\* \* \* \* \*